United States Patent [19]
Dallaire et al.

[11] Patent Number: 6,156,443
[45] Date of Patent: Dec. 5, 2000

[54] METHOD OF PRODUCING IMPROVED EROSION RESISTANT COATINGS AND THE COATINGS PRODUCED THEREBY

[75] Inventors: Serge Dallaire, Longueuil; Henri Levert, Lachine, both of Canada

[73] Assignee: National Research Council of Canada, Ottawa, Canada

[21] Appl. No.: 09/046,703

[22] Filed: Mar. 24, 1998

[51] Int. Cl.⁷ ............................................. B32B 15/16
[52] U.S. Cl. .................... 428/553; 428/563; 428/564; 428/683; 428/685; 428/937
[58] Field of Search ..................... 420/553, 563, 420/564, 683, 685, 937

[56] References Cited

U.S. PATENT DOCUMENTS

| | | |
|---|---|---|
| 3,720,990 | 3/1973 | Larsen . |
| 3,790,353 | 2/1974 | Jackson et al. . |
| 3,946,793 | 3/1976 | Kachik et al. . |
| 3,947,254 | 3/1976 | Kachik et al. . |
| 3,970,445 | 7/1976 | Gale et al. . |
| 3,999,952 | 12/1976 | Kondo et al. . |
| 4,011,051 | 3/1977 | Helton et al. . |
| 4,066,422 | 1/1978 | Moen . |
| 4,113,920 | 9/1978 | Helton et al. . |
| 4,131,473 | 12/1978 | Kachik et al. . |
| 4,133,679 | 1/1979 | Ray . |
| 4,194,900 | 3/1980 | Ide et al. . |
| 4,235,630 | 11/1980 | Babu . |
| 4,259,119 | 3/1981 | Wantanabe et al. . |
| 4,292,081 | 9/1981 | Wantanabe et al. . |
| 4,389,439 | 6/1983 | Clark et al. . |
| 4,427,446 | 1/1984 | Miura et al. . |
| 4,430,122 | 2/1984 | Pauga . |
| 4,584,169 | 4/1986 | Werner et al. . |
| 4,673,550 | 6/1987 | Dallaire et al. . |
| 4,678,510 | 7/1987 | Jandeska, Jr. et al. . |
| 5,004,581 | 4/1991 | Takagi et al. . |
| 5,036,028 | 7/1991 | Wantanabe et al. . |
| 5,071,618 | 12/1991 | Sanchez-Caldera et al. . |

FOREIGN PATENT DOCUMENTS

| | | |
|---|---|---|
| 1003246 | 1/1977 | Canada . |
| 1110881 | 10/1981 | Canada . |
| 0158693 | 4/1984 | European Pat. Off. . |
| 941120574 | 12/1994 | European Pat. Off. ........ C22C 38/00 |
| 0 659894 A2 | 6/1995 | European Pat. Off. . |
| 2217433 | 9/1974 | France . |
| 58-101622 | 6/1983 | Japan . |
| 543479 | 3/1977 | U.S.S.R. . |
| 1319465 | 9/1973 | United Kingdom . |

OTHER PUBLICATIONS

Benard et al., Metallurgie Generale, p. 388, 1969 no month.

*Primary Examiner*—Deborah Jones
*Assistant Examiner*—Jason Savage
*Attorney, Agent, or Firm*—MacRae & Co.; H. Wayne Rock; Angus J.S. Davidson

[57] ABSTRACT

A method of on site application of an erosion resistant coating. When deposited on the surface of a metallic substrate, the coating comprises hard ferroboride phases bound with a ductile metallic phase. The ductile metallic phase is selected from metals which have a low affinity for oxygen. The preparation and composition of a cored wire adapted for use in application of the erosion resistant coatings are also disclosed.

4 Claims, 22 Drawing Sheets

2919 20KV    X400   10μm  WD10

2908 20KV    X400   10μm  WD10

Scanning electron micrographs of the surface of arc-sprayed coatings (P-3) (Backscattered image)

2919 20KV    X400   10μm  WD10

2908 20KV    X400   10μm WD10

Scanning electron micrographs of the surface of
arc-sprayed coatings (P-3) (Backscattered Image)

2061  20KV      X300 100μm WD10

1130  20KV      X300 100μm WD10

Scanning electron micrographs of the cross-sections
of arc-sprayed coatings (P-3)

METHOD OF PRODUCING IMPROVED EROSION RESISTANT COATINGS AND THE COATINGS PRODUCED THEREBY

BACKGROUND OF THE INVENTION (a) Field of the Invention

The invention relates to a method of preparing a cored wire suitable for use in coating metallic articles which are exposed to erodent particles. In particular, the invention relates to deposition of an erosion resistant coating which is comprised of larger ferroboron phases bound with a ductile metallic phase, said ductile metallic phase having a low affinity for oxygen.

(b) Description of the Prior Art

Solid particle erosion is defined as the progressive loss of material from a solid surface that results from repeated impact of solid particles. Solid particle erosion is to be expected whenever hard particles are entrained in a gas or liquid medium impinging on a solid at any significant velocity, generally greater than 1 m/s. Manifestations of solid particle erosion include thinning of components, a macroscopic scooping appearance following the gas-particle flow field, surface roughening which severity depends on particle size and velocity, lack of directional grooving characteristic of abrasion and, in some cases, the formation of ripple patterns.

The distinction between erosion and abrasion should be clarified, because terms are very often misunderstood and situations not adequately classed. Solid particle erosion refers to a series of particles striking and rebounding from the surface, while abrasion results from the sliding of abrasive particles across a surface under the action of an externally applied force. The clearest distinction is that, in erosion, the force exerted by the particle on the material is due to their deceleration, while in abrasion it is externally applied and constant.

Therefore, erosion is affected by three types of variables: impingement variables describing the particle flow (velocity, impingement angle and particle concentration), particle variables (particle shape, size, hardness and friability) and material microstructure. The velocity of erodent has a marked influence on the rate of material removal. It is generally admitted that the rate of erosion exponentially (the exponent being between 2 and 2.5 for metals and 2.5 and 3 for ceramics) increases with the velocity. Angular particles produce erosion rates higher than rounded ones. The hardness of erodent particles relative to the material being eroded should be considered.

Depending on their nature, materials have a different response to erosion. Material removal in ductile material involves large plastic flow while, in ceramics fracture is of primary importance, particularly for higher incidence angles. Solid particles impacting metals form plastic impact craters and displace material. At low incidence angles, the displaced material is thereafter cut and removed by a mechanism known in the scientific literature as "platelet mechanism". Metallic materials present higher erosion rate at low impact angle than at high impact angle. Conversely, ceramics are more damaged at high impact angles than at low impact angles and present erosion peak at 90°. In their case, the mechanism of material removal involves cracks initiated by brittle fracture for erosion at normal incidence angle.

Thus, for particles impacting at low velocity hard materials are usually considered at low impact angle but elastic materials should be selected at high impact angle. For higher particle velocity hard materials with some toughness are selected for low impact angle and resilient materials showing a compromise between strength and ductility are chosen for high impact angles. Resilience is required to resist penetration of the surface by impacting particles. Therefore, the selection of materials to resist erosion depends on the angle at which the particles strike the surface and the impact velocity.

Two-phase materials such as high chromium white cast irons and Stellites might be expected to exhibit high erosion resistance. It could be expected that such alloys could combine the relatively good erosion of hard ceramic phase with the desirable ductility and toughness of a metal. Though these alloys provide excellent abrasion resistance, under most erosion conditions they exhibit little or no improvement over plain carbon steels or pure metals. There is a synergetic increase of the erosion of hard and brittle phase by its presence as a dispersed phase in a relatively soft metal matrix. As an example, the eroded surface of white cast iron by quartz sand shows that primary carbide are deeply depressed below the surface.

Erosion is considered as a serious problem in many engineering systems such as steam and jet turbines, pipelines and valves carrying particulate material and fluidized bed combustion systems. Generally speaking, machinery for use in processing and transportation of fluids containing solid particles are exposed to damage resulting from erosion. Processing machines for processing resins containing glass fibers, carbon fiber, asbestos or iron oxide; slurry pumps for fluid transportation of ore or coal; pipelines for transporting slurries and so forth are examples of industrial machinery that are damaged by solid particle erosion.

Particularly, high-temperature fluidized bed metal components exposed to temperatures up to 500° C. and process fans that aspirate gas having temperatures that reach 350° C. suffer extensive material wastage. Heat exchanger tubes in fluidized bed combustors experienced relatively high wastage rate at low temperature (250° C.). The wastage rate increases with the temperature and the particle velocity. Peak wastage rates are observed for 347 stainless steel at 450° C., for Incoloy 800H at 450° C., for mild steel at 300° C., for 1Cr-0.5Mo steel at 400° C., for 2.25Cr-1Mo at 400° C., for 722M24T steel at 400° C. At temperatures above 100° C., erosion enhances oxidation. The wastage involves the formation and removal of oxide by impacting particles. At these temperatures, thin oxide layers are formed at much greater rates than would be the case during static oxidation. Impacting particles repeatedly take off thin oxide layers, the exposed metallic surface being readily oxidized. Therefore, in these conditions, erosion accelerates the oxidation of materials.

In process fans used in pelletizing plants to re-circulate hot gas containing iron ore particles, the same type of wastage is observed. Iron ore pellets are sintered in continuous large industrial oil-fired furnaces. From the furnace, large volumes of hot gas are sucked by powerful fans. Being exposed to gas-borne iron particles and temperatures ranging between 125° C. and 328° C. fan components are rapidly deteriorated. Extensive part repair or replacement are required for maintaining a profitable operation.

Cobalt- and nickel-bonded tungsten carbide coatings as well as nickel-bonded chromium carbide have been widely adopted in various applications because of their wear resistance. Unfortunately, these coatings are applied using expensive high velocity oxy-fuel and plasma spraying techniques. In addition, these coating techniques are not suited for on-site applications, particularly in restricted areas. These materials contain strategic, price-sensitive elements such as nickel, chromium and tungsten and/or do not necessarily offer the best erosion resistance in applications mentioned above. These elements (WC) are either strategic or scarce, so that the carbide materials are price sensitive. In addition, elements contained within these materials present some toxicity restricting their use in some applications, requiring expensive health protection equipment and limiting personnel exposure to toxic dust.

There are many workers that have previously proposed materials based on iron and iron borides for different applications.

Kondo, Okada, Minoura and Watanabe in (U.S. Pat. No. 3,999,952) (1976) proposed a method to produce a sintered hard alloy, prepared from a hard alloy powder comprising iron boride or iron multiple boride in which a part of iron boride is substituted by a non-ferrous boride or multiple boride.

In a subsequent patent (U.S. Pat. No. 4,194,900) (1980) Ide, Takagi, Watanabe, Ohhira, Fukumori and Kondo proposed a modification in the method for producing the hard alloy powder by using different raw materials for improving strength and hardness. In these works, hard alloys are produced by crushing the hard alloy powder, pressing the milled powder and sintering the compact under vacuum or controlled atmosphere.

Ide, Kawamura, Ohhira, Watanabe and Kondo in Jap. Pat. No. Sho (1983)-101622 proposed a method of using hard sintered alloys of the iron-based complex series in combination to form paired metals. The hard phase of these alloys contains 35–96 wt. % iron-based complex boride with the remaining consisting of one or more of Cr, Fe, Mo, W, Ti, V, Nb, Ta, Hf, Zr, Ni, Co, Mn or the alloys of these metals to form the bonding phase. Sliding wear properties of the sintered alloys against metals were evaluated using the Ohgoshi sliding wear tester.

Watanabe, and Shimizu in U.S. Pat. No. 4,259,119 (1981) proposed a sintered body suitable as abrasive material comprising 70 to 99.99% of a combination of at least two kinds of metal borides selected from the group consisting of diborides of Ti, Ta, Cr, Mn, Mo, Y, Hf, Nb, Al and Zr and from 0.01 to 30% by weight of a metal boride or borides selected from the group consisting of borides of nickel, iron and cobalt.

Watanabe and Kono in U.S. Pat. No. 4,292,081 (1981) proposed sintered refractory and abrasive bodies composed of titanium diboride, chromium diboride, tantalum diboride with minor amounts of metal borides such as MnB, $Mn_3B_4$, $Mn_2B$, $Mn_4B$, TiB, $Ti_2B_5$, $W_2B_5$ and $Mo_2B_5$. In the preparation of sintered bodies iron boride, nickel borides and cobalt borides are also added to favour liquid phase sintering. Watanabe et al. in U.S. Pat. No. 5,036,028 proposed a high density metal-boride based ceramic sintered body composed of at least: a) $TiB_2$, $ZrB_2$, $CrB_2$, $HfB_2$, $VB_2$, $TaB_2$, $NbB_2$, $MoB_2$, $YB_2$, $AlB_2$, $MgB_2$, CrB, VB, TaB, NbB, MoB, HfB, YB, ZrB, HfB, TiB, MnB, $W_2B_5$ and $Mo_2B_5$; b) 0.1 to 10 wt. % of cobalt boride, nickel boride or iron boride and c) 0.1 to 10 wt. % of a double carbide comprising Ti, Zr, W and C, ZrCN, HfCN or a double carbo-nitride comprising Ti, Zr, Hf and C,N.

Jandeska and Rezhets in U.S. Pat. No. 4,678,510 (1987) proposed a wear resistant iron alloy article formed by compacting and sintering a predominantly iron powder mixture containing additions of C, Cu and nickel boride. The product microstructure comprises hard borocementite particles dispersed in a martensitic or pearlite matrix. The particles have a cross-sectioned dimension greater than 1 $\mu$m, in an amount preferably between 10 and 30 volume percent to improve the wear resistance. This material was developed for automotive gears.

Saito and Kouji in Eur. pat. No. 0659894A2 proposed a high modulus iron-based alloy comprising a matrix of iron or iron alloy and one boride selected from the group consisting of borides of group Iva elements, and complex borides of group Va element and iron dispersed in the matrix. The iron based-alloy is obtained by sintering at temperature of 1000 to 1300° C. The sintered product is undesirably likely to form liquid phase above 1300° C. In samples 13–15, Fe-17Cr is mixed with ferrotitatium and ferroboron powders.

Miura, Arakida, Kondo and Ide in U.S. Pat. No. 4,427,446 (1984) proposed a wear-resistant composite material for use in centrifugally cast linings. The matrix metal is an oxidation-resistant nickel or cobalt alloy and the reinforcing material is a boride or a composite boride composed of chromium, iron and boron. The matrix used is either a Ni—Cr—B—Si based self-fluxing alloy or a Co—Ni—Cr—W—B—Si based self-fusing alloy. According to the inventors, the self-fluxing properties of alloys which melt at temperature comprised between 950 and 1250° C. is the key point of their process. The cylinder containing a powder mixture comprising the self-fluxing alloy and the reinforcement is first heated to the melting temperature of the alloy. Placed in a centrifuge, the melt is allowed to cool slowly. After cooling, the inner surface is rich in reinforcing particles.

Clark and Sievers in U.S. Pat. No. 4,389,439 (1983) proposed a different lining for tubes and cylinders. They proposed a composite tubing comprising an iron boride layer formed in situ by the diffusion of boron into iron. The diffusion coating obtained has an inner layer comprising dispersed iron carbide and an outer layer consisting of iron boride.

Sanchez-Caldera, Lee, Suh and Chun in U.S. Pat. No. 5,071,618 (1991) proposed a method for manufacturing a dispersion-strengthened material based on a metal matrix with a containing element capable of reacting with boron and a second metal containing metal and boron. The material is produced by injecting the two metal in liquid state at two different speeds. It produces materials containing boride particles having an average size of 0.2 $\mu$m.

Dallaire and Champagne in U.S. Pat. No. 4,673,550 (1987) proposed a process for synthesizing $TiB_2$ composite materials containing a metallic phase. The preparation of these composites comprises providing mixture titanium alloys which in addition contain Fe, Ni, Al, Mo, Cr, Co, Cu or mixtures thereof and boron or ferroboron. After heating, it results in the synthesis of composite material containing fine $TiB_2$ crystals dispersed in a metallic matrix. Coatings applied by plasma spraying possess excellent abrasion wear resistance.

Jackson and Myers in U.S. Pat. No. 3,790,353 (1974) proposed a hard facing pad usable, for example, by brazing to a digger tooth or the like. The wear pad is from 70 to 85 per cent per volume particles of cemented carbide in a metal matrix having a melting point not substantially higher than the melting point of the metal cementing the carbide.

Tagaki, Mori, Kawasaki and Kato in U.S. Pat. No. 5,004, 581 (1991) proposed a dispersion strengthened copper-base alloy for wear resistant overlay formed on a metal substrate consisting in 5–30 wt. % Ni, 0.5–3 wt. % B, 1–5 wt. % Si, 4–30 wt. % Fe, 3–15 wt. % Sn or 3–30 wt. % An, the remaining being copper. It forms boride and silicide of the Ni—Fe system dispersed in a copper-base matrix. This material is expected to provide a superior wear-resistance to slide abrasion as evaluated by the Ohgoshi abrasion tester.

Gale, Helton and Mueller in U.S. Pat. No. 3,970,445 (1976) proposed a wear-resistant alloy comprising boron, chromium an iron having high hardness produced by rapidly cooling and solidifying spheroidal particles of the molten alloy mixture. The resultant particles are cast in the desired form or incorporated into a composite alloy wherein the solid particles are held together with a matrix of different material from the alloy. This alloy was designed for use in abrasive environments (ground-engaging tools). The composite particles comprise 25–61 wt. % chromium, 6–12 wt. % boron and the balance iron and are produced by melting.

Helton, Gale, Moen, Mueller, Pierce and Vermillion in U.S. Pat. No. 4,011,051 (1977) proposed spheroidal particles of wear-resistant alloy comprising boron, chromium and iron with high hardness produced by the rapid cooling of a molten alloy mixture. The resultant solid particles are then incorporated into a composite alloy wherein the solid particles are held together with a matrix of different material from the alloy. Inserts of the alloy are useful in producing long wearing tools. The composite particles contain 25–70 wt. % chromium, 6–12 wt. % boron, 0–2 wt. % carbon, the remaining being iron. One of the brazing alloy consist in 94.0 wt. % nickel, 3.5 wt. % silicon, 1.5 wt. % boron, 1.25 wt. % iron and 0.03 wt. % carbon.

Helton, Gale, Moen, Mueller, Pierce and Vermillion in U.S. Pat. No. 4,113,920 (1978) proposed a ground engaging tool resisting to wear including a contact section for engaging the ground and at least a portion of said section reinforced with a wear resistant alloy, said wear resistant alloy comprising cast spherical of a first alloy embedded in a matrix of a second alloy in which said first alloy is soluble with difficulty and wherein the first alloy comprises from about 25–70 wt. % chromium, from about 6–12 wt. % boron, from about 0 to about 2 wt. % carbon, and iron is the balance. The matrix is a nickel based brazing alloy. Mixed powders are jointed by conventional sintering processes.

Moen in U.S. Pat. No. 4,066,422 (1978) proposed a wear-resistant composite material and method of making an article which is particularly adaptable for use with a ground engaging tool. The composite material comprises abrasive-wear resistant particles embedded in a matrix consisting of about 3 to 5 wt. % boron, and the balance being iron having residual impurities. The boron is controlled to a level of approximately 3.8 wt. % corresponding to the eutectic Fe—B composition which has the low melting temperature of 1161° C.

E. I. Larsen in U.S. Pat. No. 3,720,990 (1973) disclosed a molybdenum alloy containing at least two metallic elements which form an alloy which melts at a temperature considerably below that of molybdenum and when in the molten state dissolves appreciable molybdenum during liquid phase sintering and which may be shaped before or after sintering, thus avoiding expensive hot working and/or hot forging.

Babu in U.S. Pat. No. 4,235,630 (1980) and Can. Pat. No. 1,110,881 (1981) proposed a wear-resistant molybdenum-iron boride alloy having a microstructure of a primary boride phase and a matrix phase. The primary boride phase comprises molybdenum alloyed with iron and boron, and the matrix phase comprises one of boron-iron in iron and iron-molybdenum in iron. The alloy finds particular utility in a composite material on a ground-engaging tool. The alloy is densified by sintering the article at a temperature sufficient for controlled formation of a liquid phase. The molybdenum-iron-boride alloy can be also crushed to form particles that can be bounded by a suitable matrix, such as the iron-boron matrix composition described in U.S. Pat. No. 4,066,422 attributed to Moen. For fabricating the sintered alloy Babu used in examples a preferred ferroboron constituent containing 25 wt. % boron.

Dudko, Samsonov, Maximovich, Zelenin, Klimanov, Potseluiko, Trunov and Sleptsov in Can. Pat. No. 1,003,246 (1977) proposed wear-resistant composite materials for hard facing equipment subjected to abrading. Particulate material containing 7–30 wt. % chromium, 40–60 wt. % titanium and 30–40 wt. % boron having a size between 0.3 to 2 mm are embedded in a low-melting alloy matrix to ensure good wettability. Preferred alloys contain: a) 30–65 wt. % copper, 10–35 wt. % nickel and 10–35 wt. % manganese; b) 12–25 wt. % chromium, 1.5–4 wt. % silicon, 1–4 wt. % boron, the balance being nickel.

Ray in U.S. Pat. No. 4,133,679 (1979) described glassy alloys containing iron and molybdenum or tungsten, together with low boron content. The glassy alloys consist essentially of about 5 to 12 atom percent boron, a member selected from the group consisting of about 25 to 40 atom percent molybdenum and about 13 to 25 atom percent tungsten and the balance iron plus incidental impurities.

The prior art references described above relate to compositions of matter which differ from those of the subject application. Alternatively, the physical properties of the subject invention, namely hard ferroboron phases of relatively large area bound with a ductile metallic phase, provide an erosion resistant coating which is surprisingly superior to prior art coatings.

SUMMARY OF THE INVENTION

An object of the invention is thus to provide a oxidation-resistant and erosion-resistant composite material that is formed by high temperature melting a metal possessing low affinity for oxygen with requisite proportion of ferroboron particles of the required particle size. Raw materials are shaped in the form of a cored wire that is arc sprayed with air or deposited by welding techniques for producing erosion-resistant coatings for components exposed to a high velocity blasts of large particles at temperatures up to 500° C.

The above object is attained by employing a ductile metal having low affinity for oxygen such as iron, low carbon steel or ductile stainless steel with coarse ferroboron particles. The resulting coatings are composed of boride phases having mean sizes at least equal or larger than the sizes of erodent impacts.

Broadly, the invention comprehends an oxidation resistant and ductile metal cementing boride particles which is formed by bringing the metal and boride particles together at temperatures higher than the melting temperature of the metal. The formed material is composed of large hard boride phases bonded by resilient, ductile and oxidation-resistant metallic phases. It can be preferably obtained in the form of erosion-resistant coatings by arc spraying cored wires composed of a sheath of the selected metal and a core comprising only the boride particles.

In particular, the invention comprises a two-phase composite coating having select microstructural features. In preferred embodiments, coatings prepared by the process of the invention will contain hard boride phases bounded with a ductile metallic phase.

In said preferred embodiments, the exposed surface areas of the majority of the hard boride phases will be greater than the mean impacting surface of the erodent particles. Additionally, the ductile metallic phases will, in preferred embodiments, be smaller in exposed surface area than the mean impacting surface of the erodent particles. Such embodiments of the invention will resist erosion by deflection of the erodent particles off of the hard boride phases. Further, the reduced surface area of the ductile metallic phase prevents ploughing of this phase by erodent particles and the plastic deformation which results therefrom.

The inventor has determined that the most damaging iron ore particles typically range in size from 32–300 μm in size and that the mean particle size is 89 μm. It has also been determined that with particles of this size, the mean size of impact in collisions with a relatively smooth surface corresponds to 14.5 μm in maximum length. Accordingly, when the erodent particle is iron ore, the inventor has determined that a preferred embodiment of the invention comprises a two phase coating wherein the surface includes (a) hard ferroboron phases having a surface area which generally corresponds to a geometric area having 14.5 μm in length or greater and (b) a ductile metallic phase which houses the ferroboron phases. The ductile metallic phase must be selected from metals which have a low affinity for oxygen. Further, the ductile metallic phase should have surface exposure in the regions between the ferroboron hard phases having surface area sizes which correspond to circles having diameters less than about 14.5 μm.

It has been determined that coatings having the above-mentioned microstructural properties are most efficiently prepared by arc spraying or deposition by welding techniques. The components of the coating are provided in the form of a cored wire wherein the sheath is composed of the ductile metallic phase and the powdered core is composed of a coarse ferroboride powder. Advantageously, the invention allows for on site deposition of the coating.

DESCRIPTION OF THE DRAWINGS

(FIG. 2) and 330° C. (FIG. 3).

(FIG. 8) and 330° C. (FIG. 9).

(FIG. 10) and 330° C. (FIG. 11).

DESCRIPTION OF PREFERRED EMBODIMENTS

Figure 1:
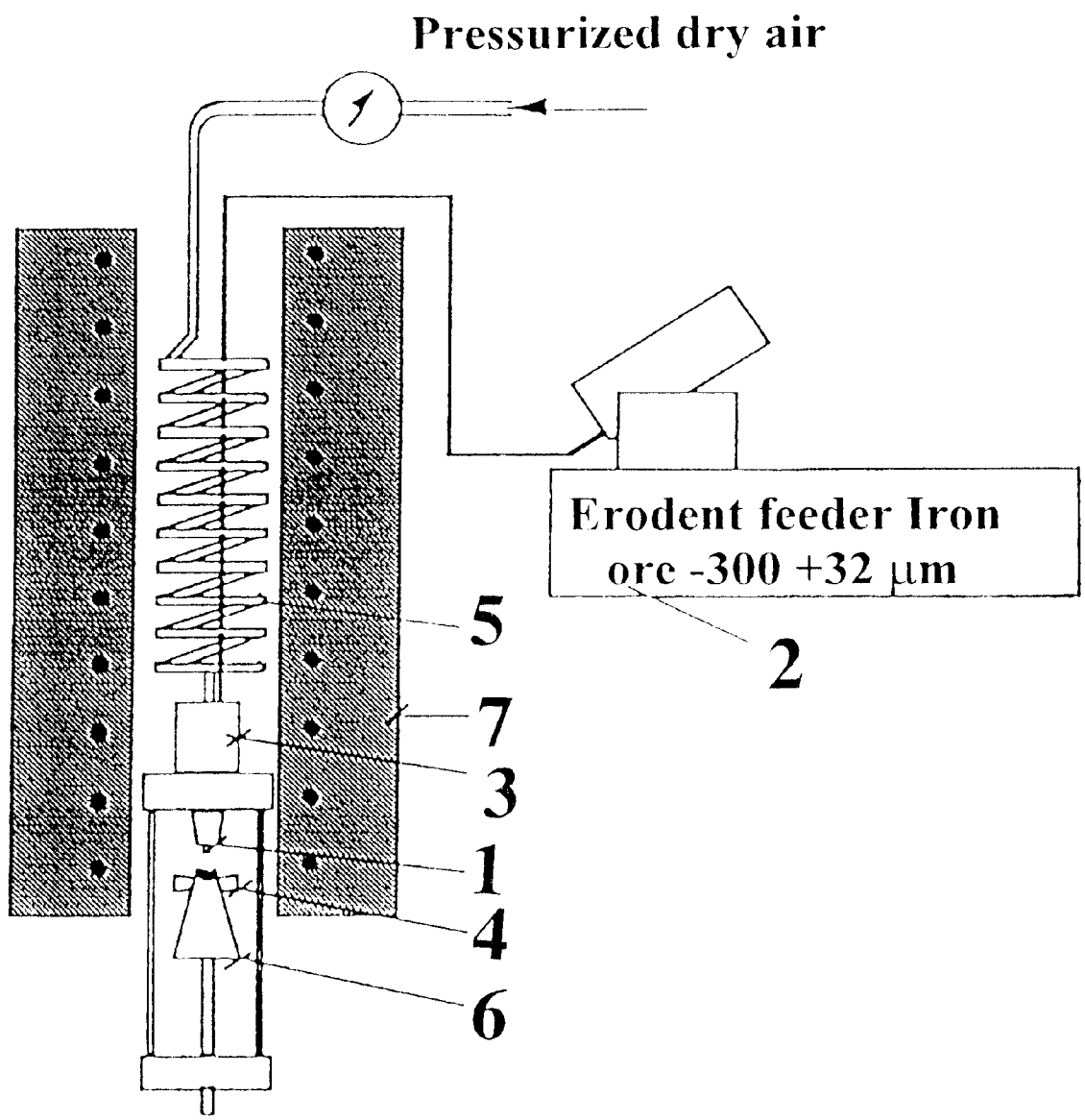
FIG. 1: Schematic view of a device adapted to simulate accelerated erosion.
Figure 2:
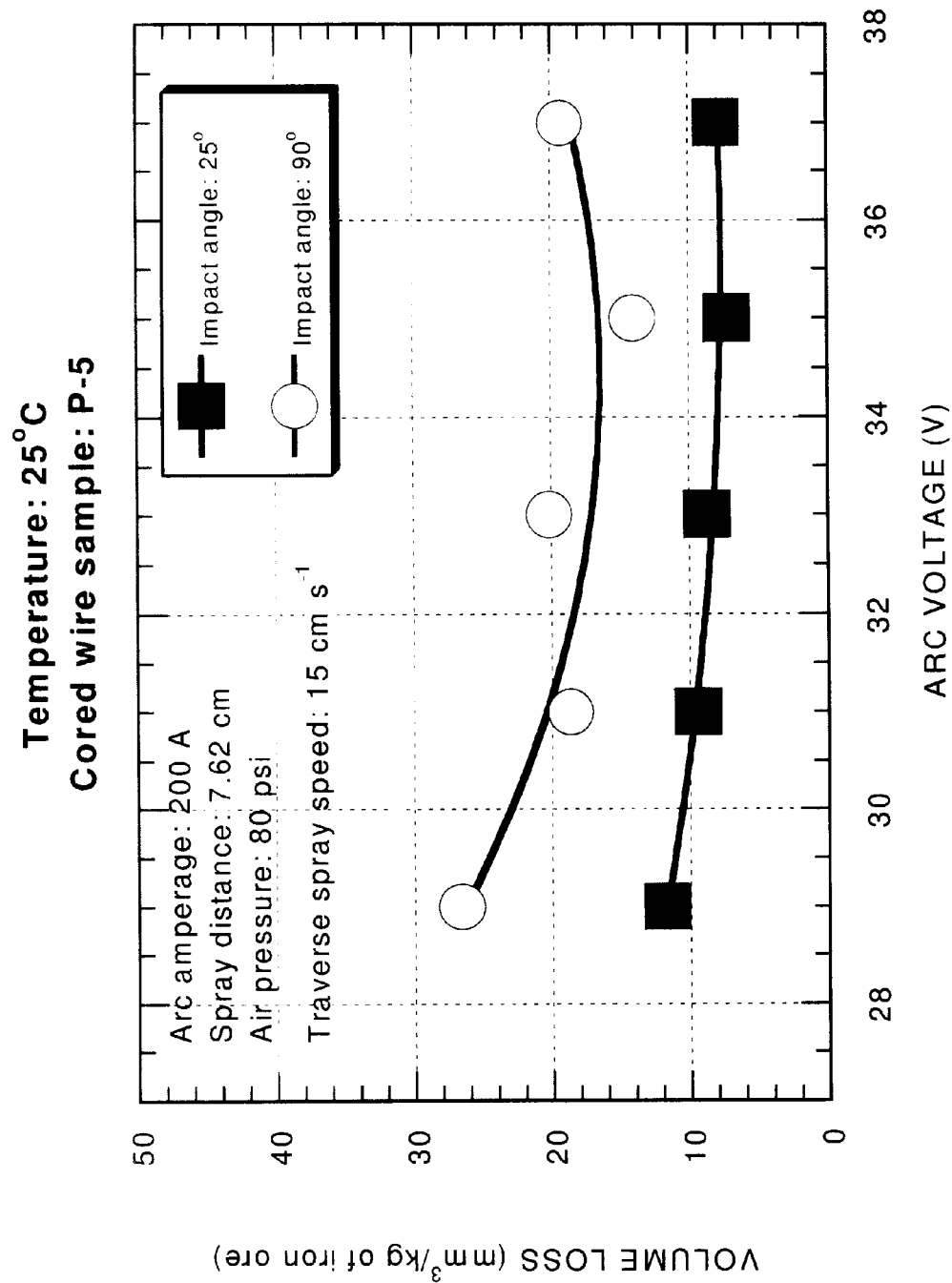
FIGS. 2, 3: Graphical representation of the effect of changes in arc voltage on erosive volume loss at 25° C.
Figure 3:
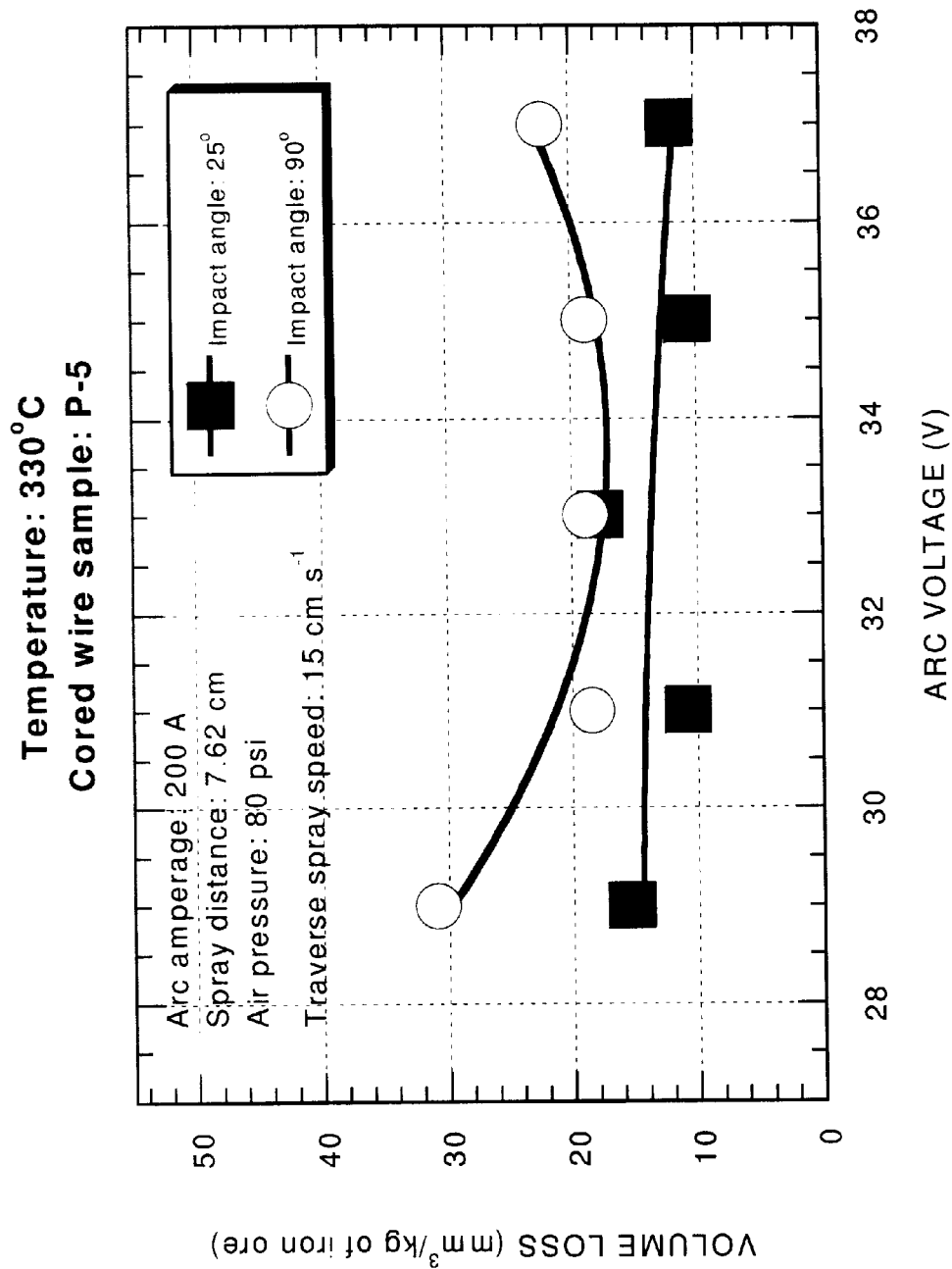
Figure 4:
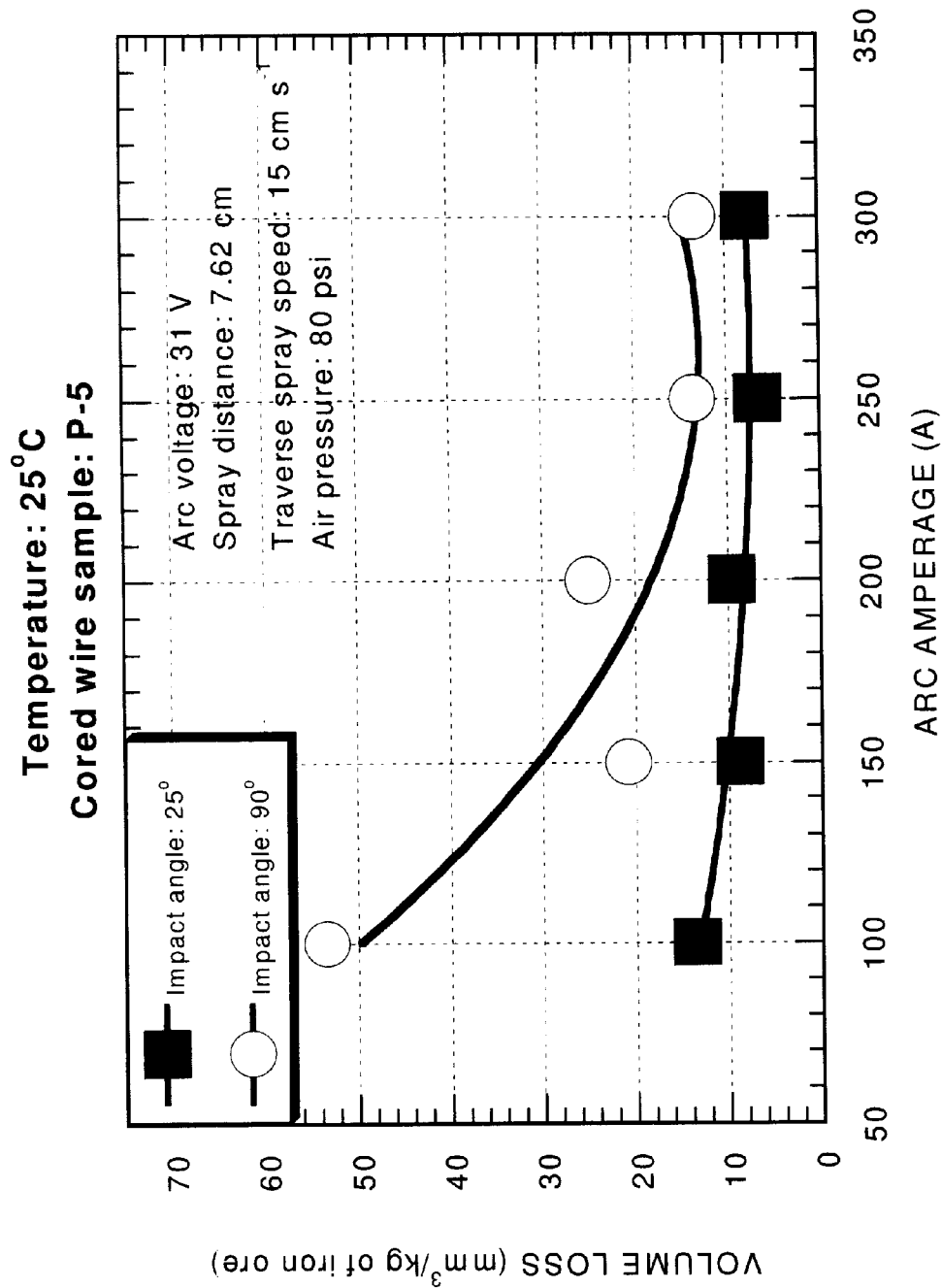
FIGS. 4, 5, 6, 7: Graphical representation of the effect of changes in arc amperage on erosive volume loss at 25° C./31 Volts (FIG. 4), 330° C./31 Volts (FIG. 5), 25° C./35 Volts (FIG. 6) and 330° C./35 Volts (FIG. 7).
Figure 5:
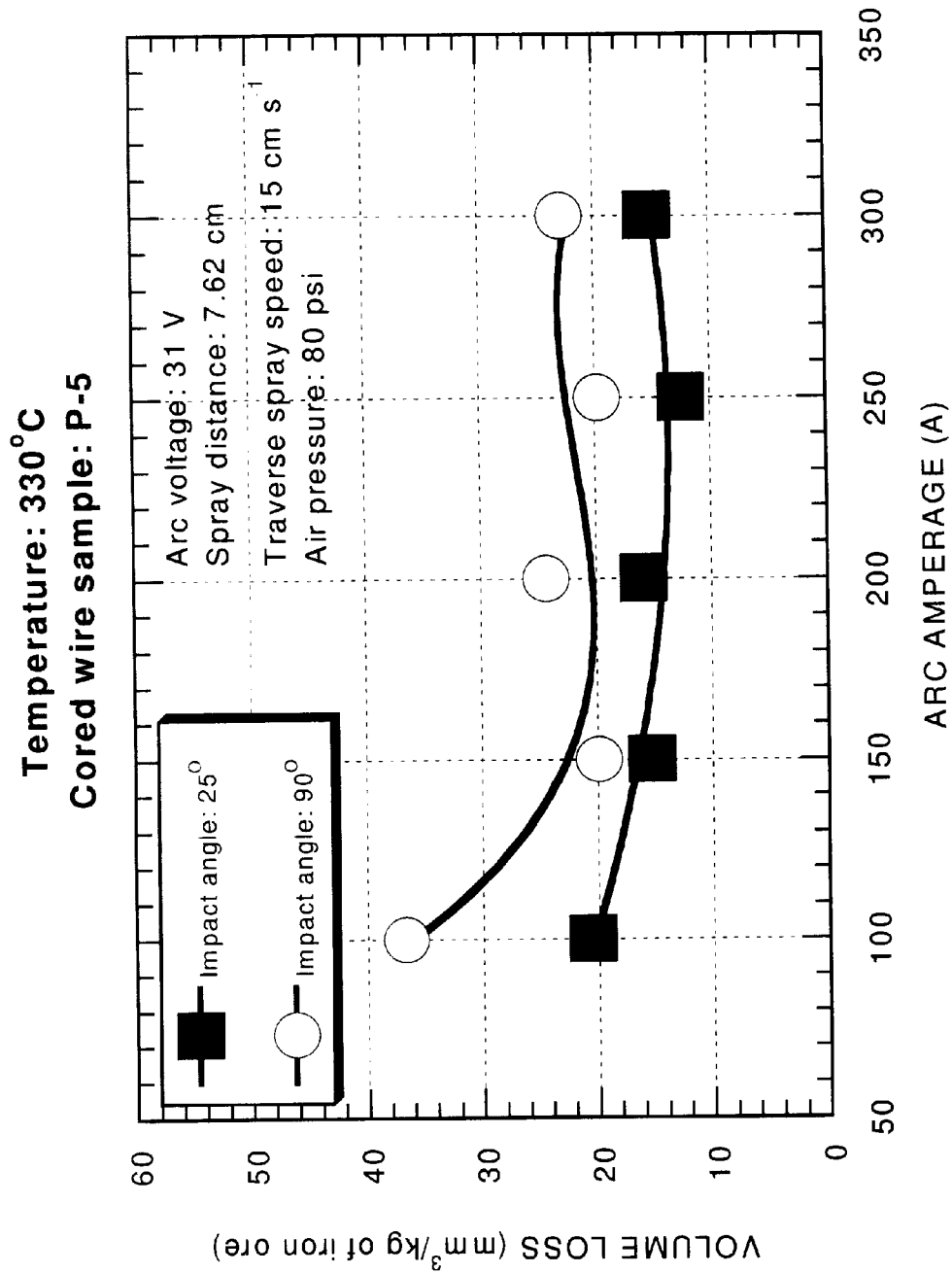
Figure 6:
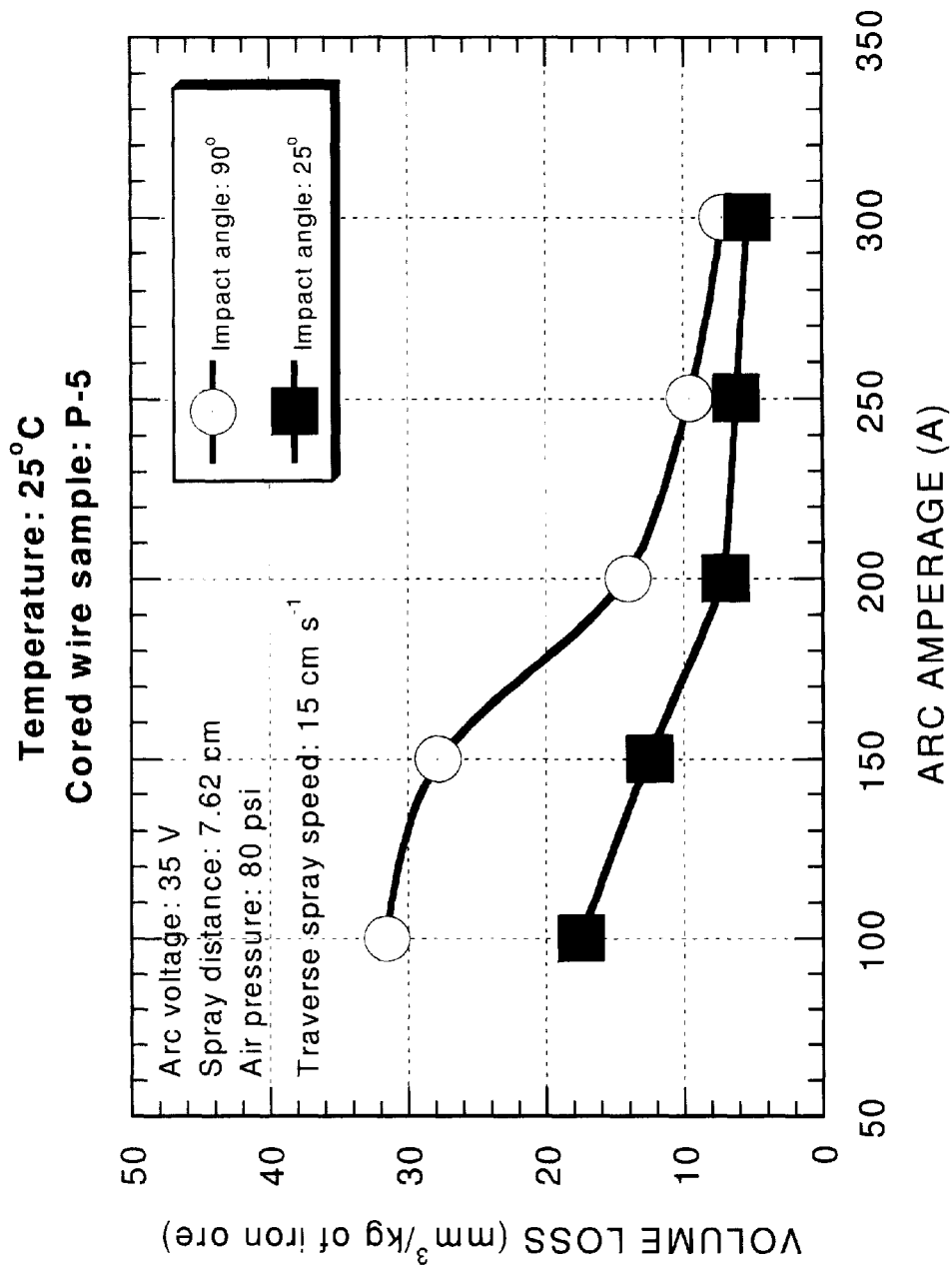
Figure 7:
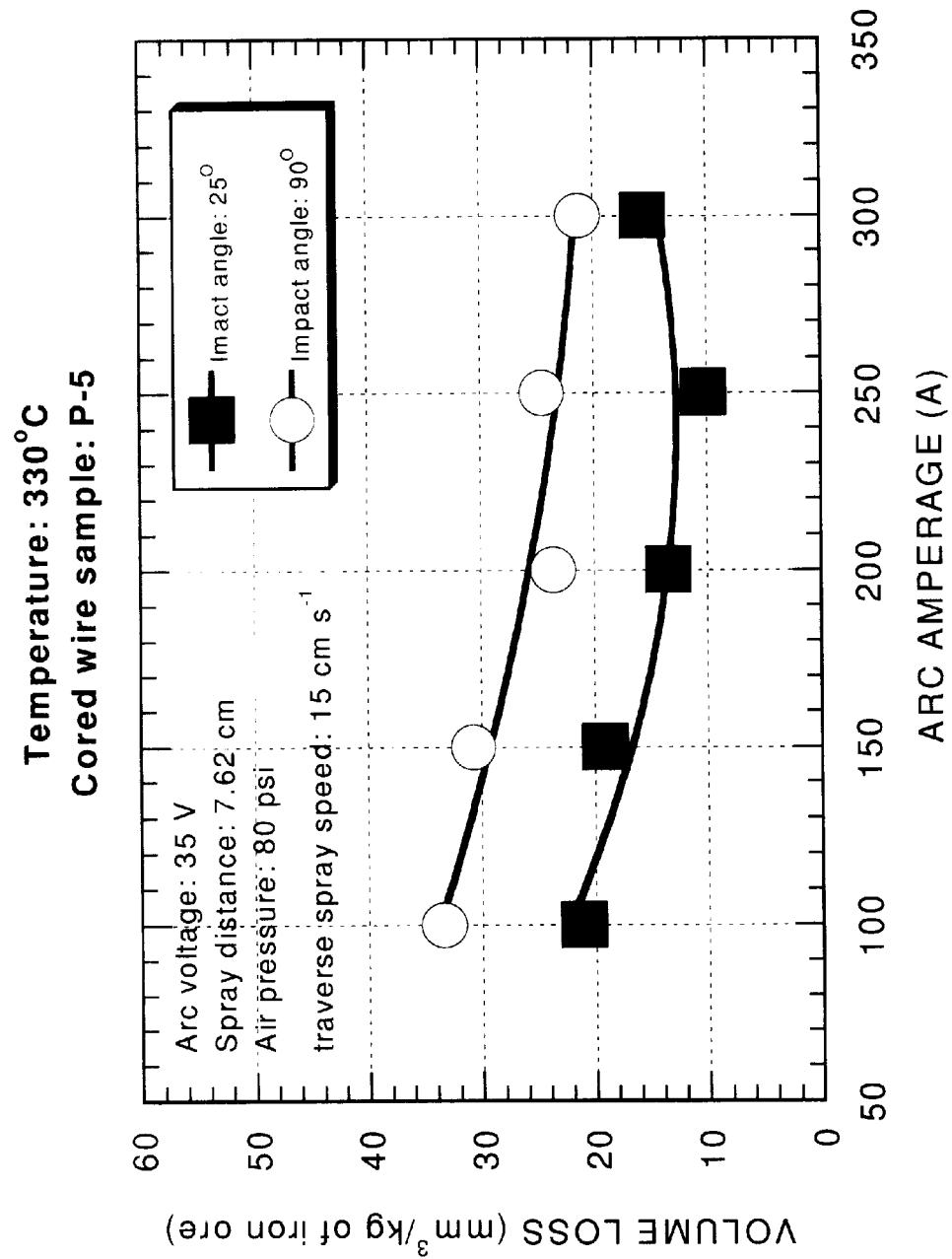
Figure 8:
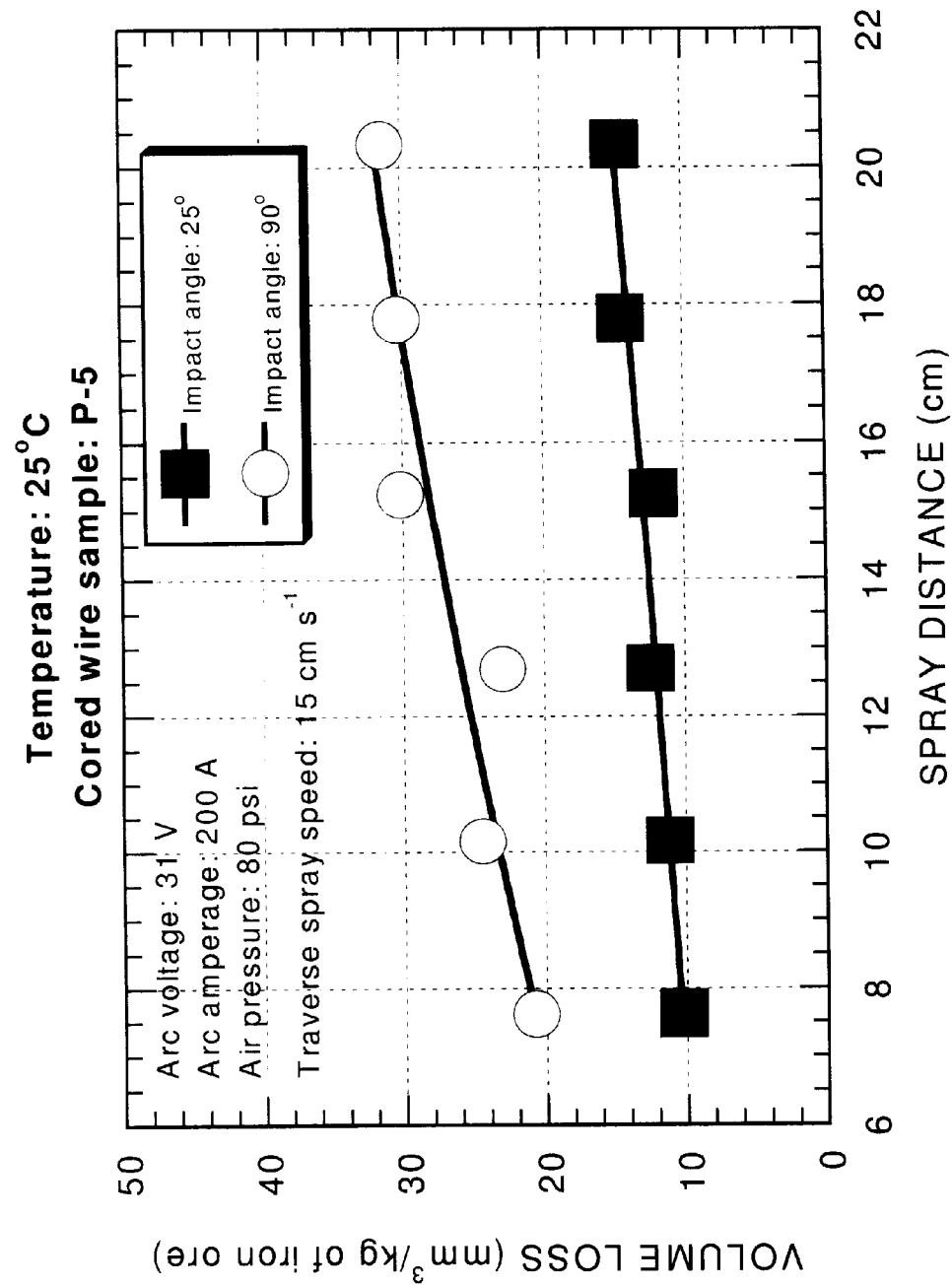
FIGS. 8, 9: Graphical representation of the effect of changes in spray distance on erosive volume loss at 25° C.
Figure 9:
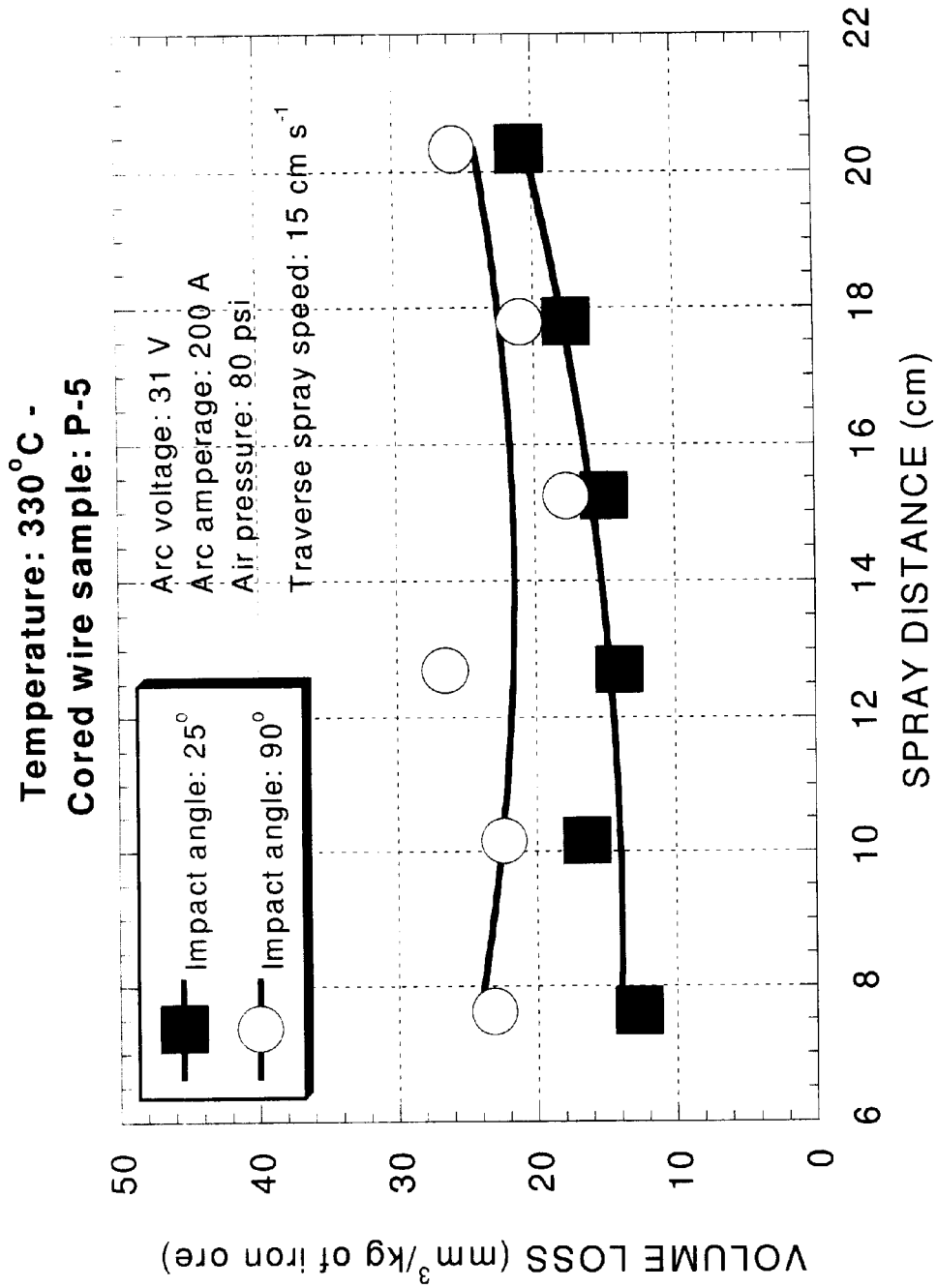
Figure 10:
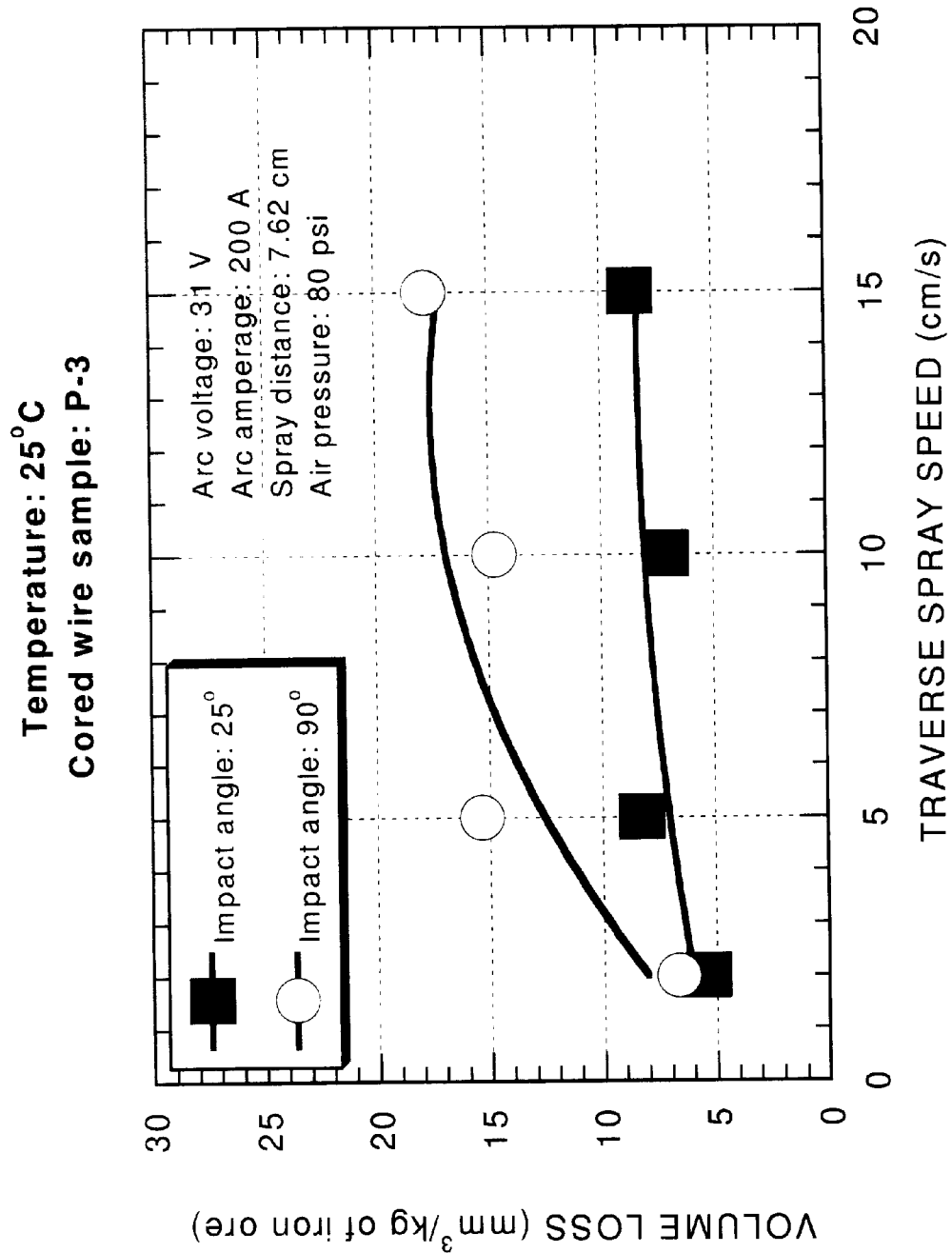
FIGS. 10, 11: Graphical representation of the effect of changes in transverse spray speed on erosive volume loss at 25° C.
Figure 11:
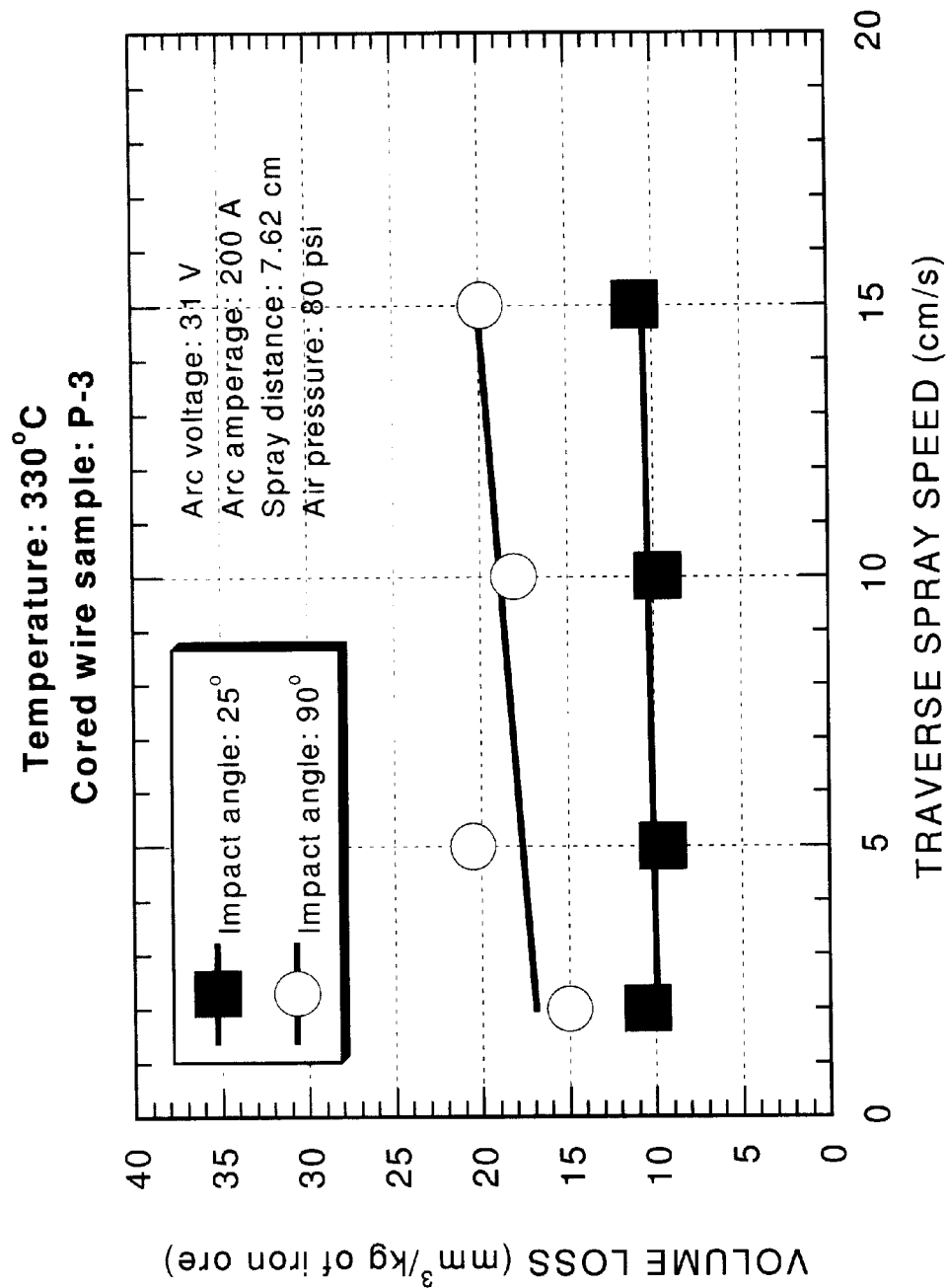
Figure 12:
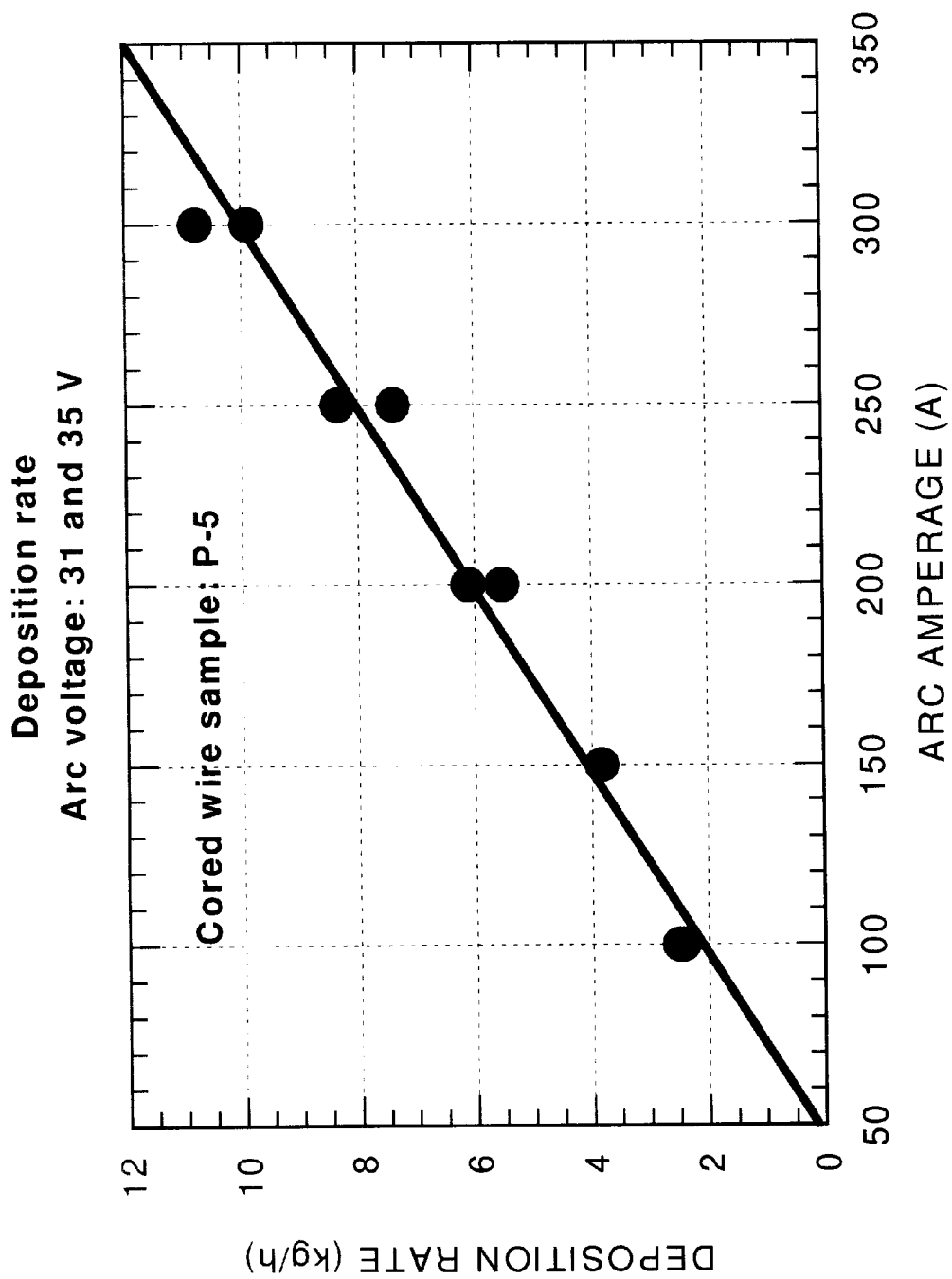
FIG. 12: Graphical representation of the effect of changes in the arc amperage on the deposition rate.
Figure 13:
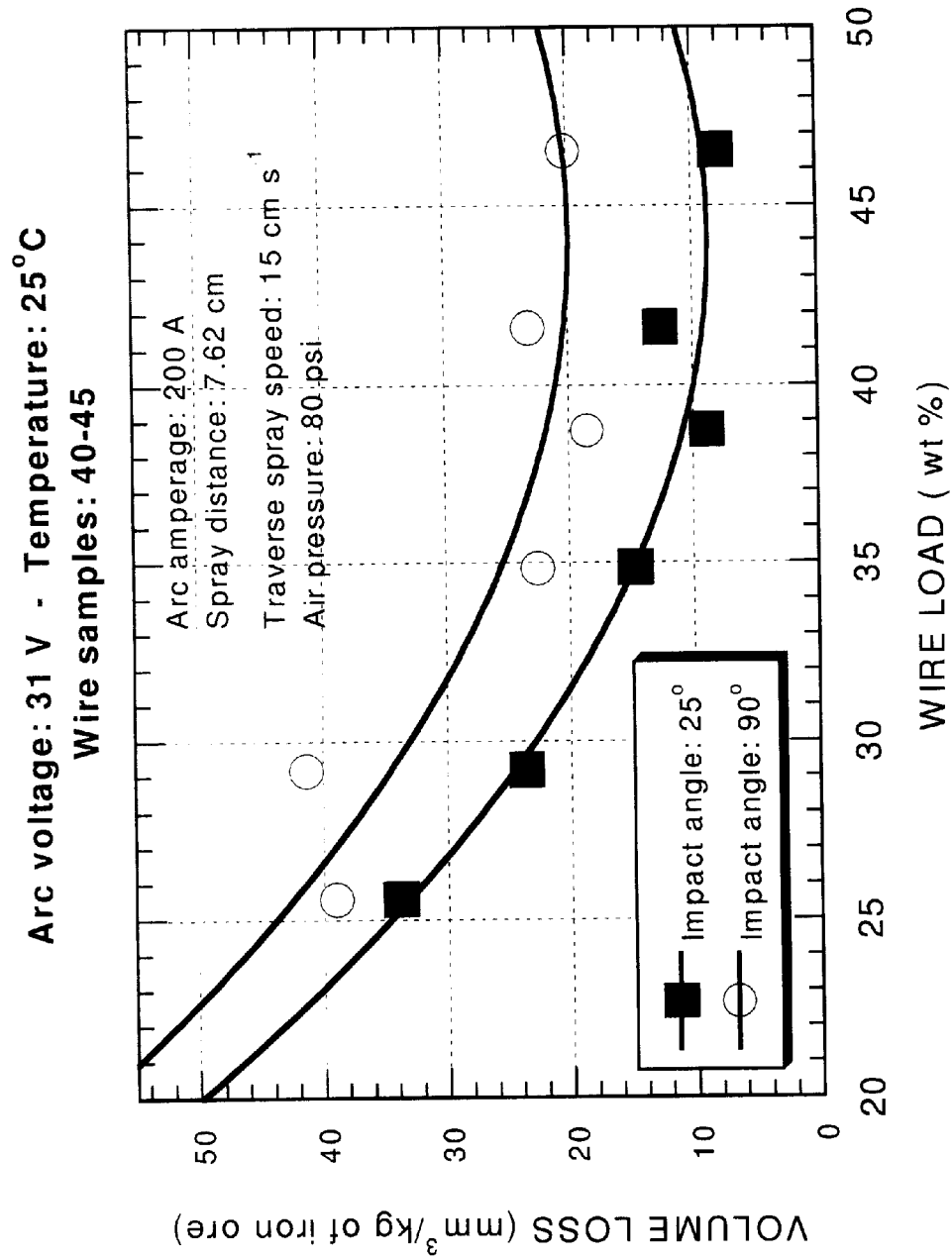
FIGS. 13, 14, 15, 16: Graphical representation of the effect of changes in the wire load on the erosive volume loss at 25° C./31 Volts (FIG. 13), 330° C./31 Volts (FIG. 14), 25° C./35 Volts (FIG. 15) and 330° C./35 Volts (FIG. 16).
Figure 14:
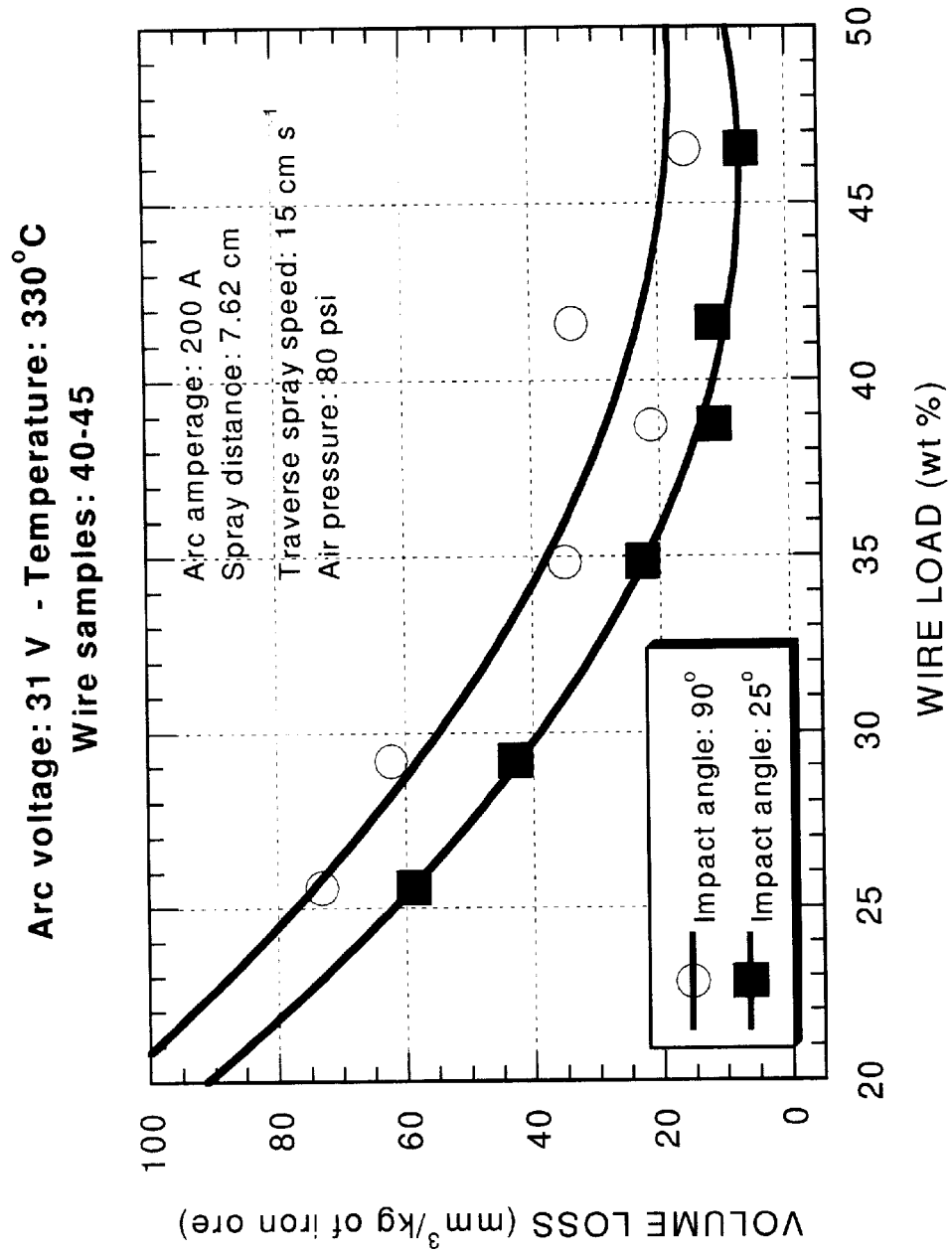
Figure 15:
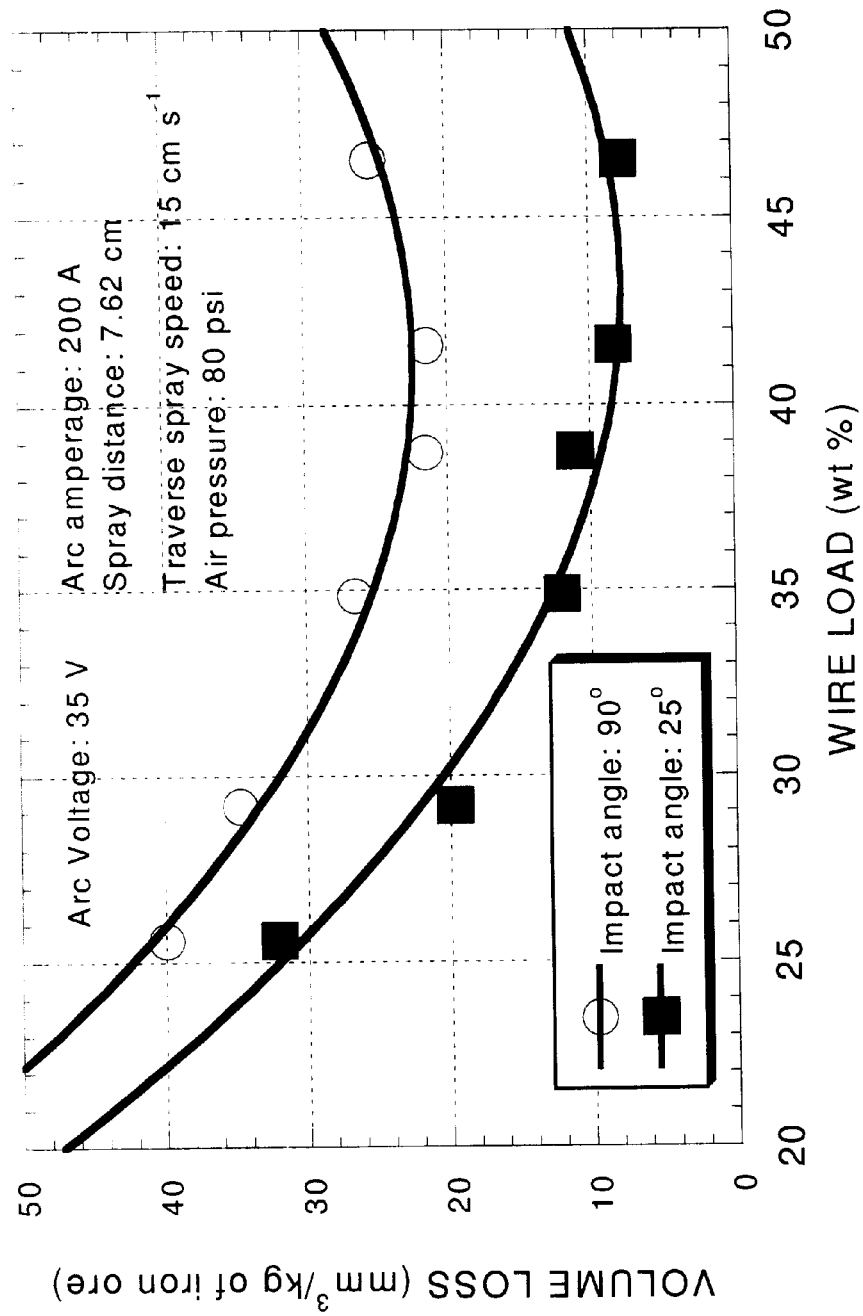
Figure 16:
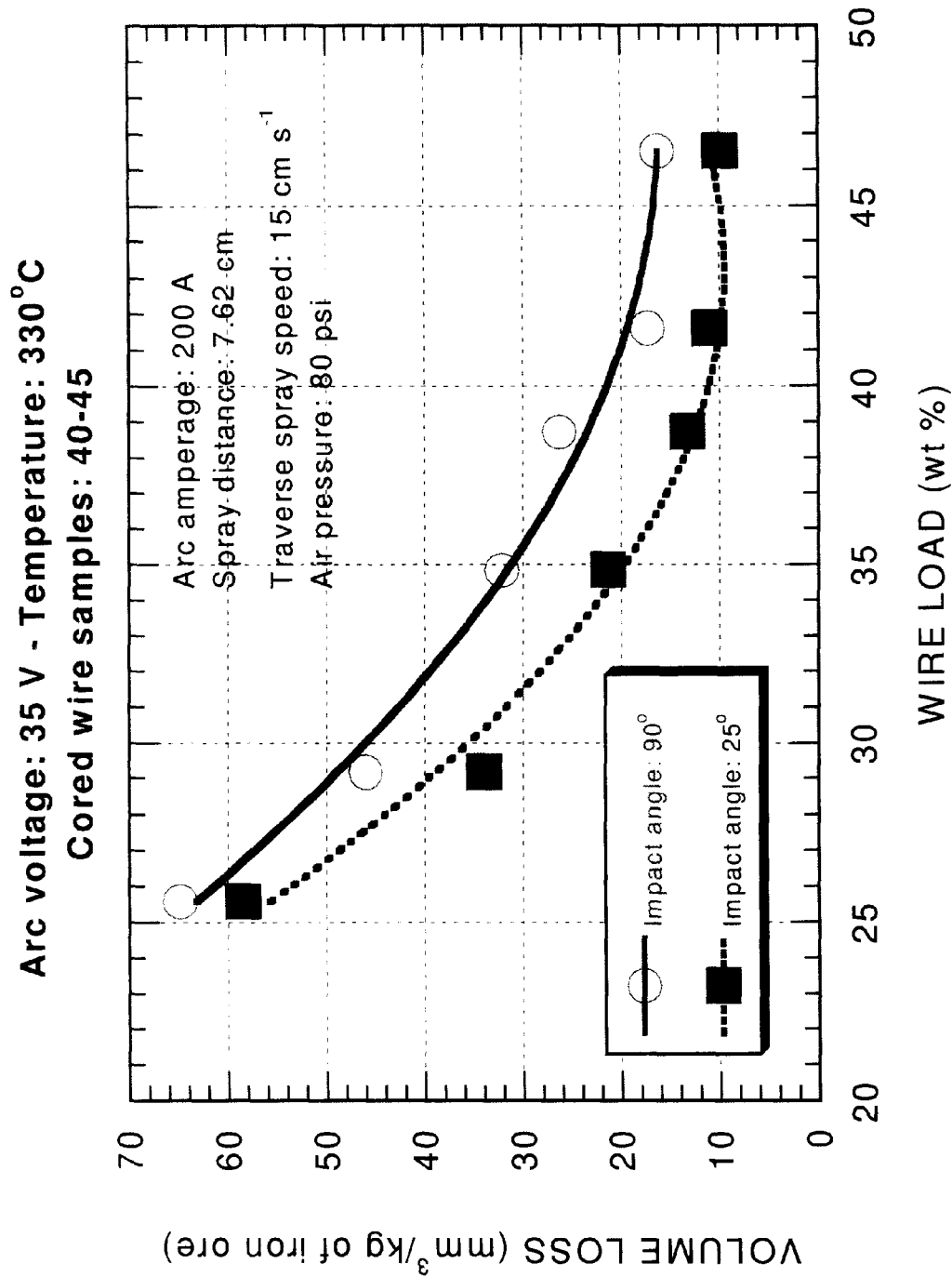
Figure 17:
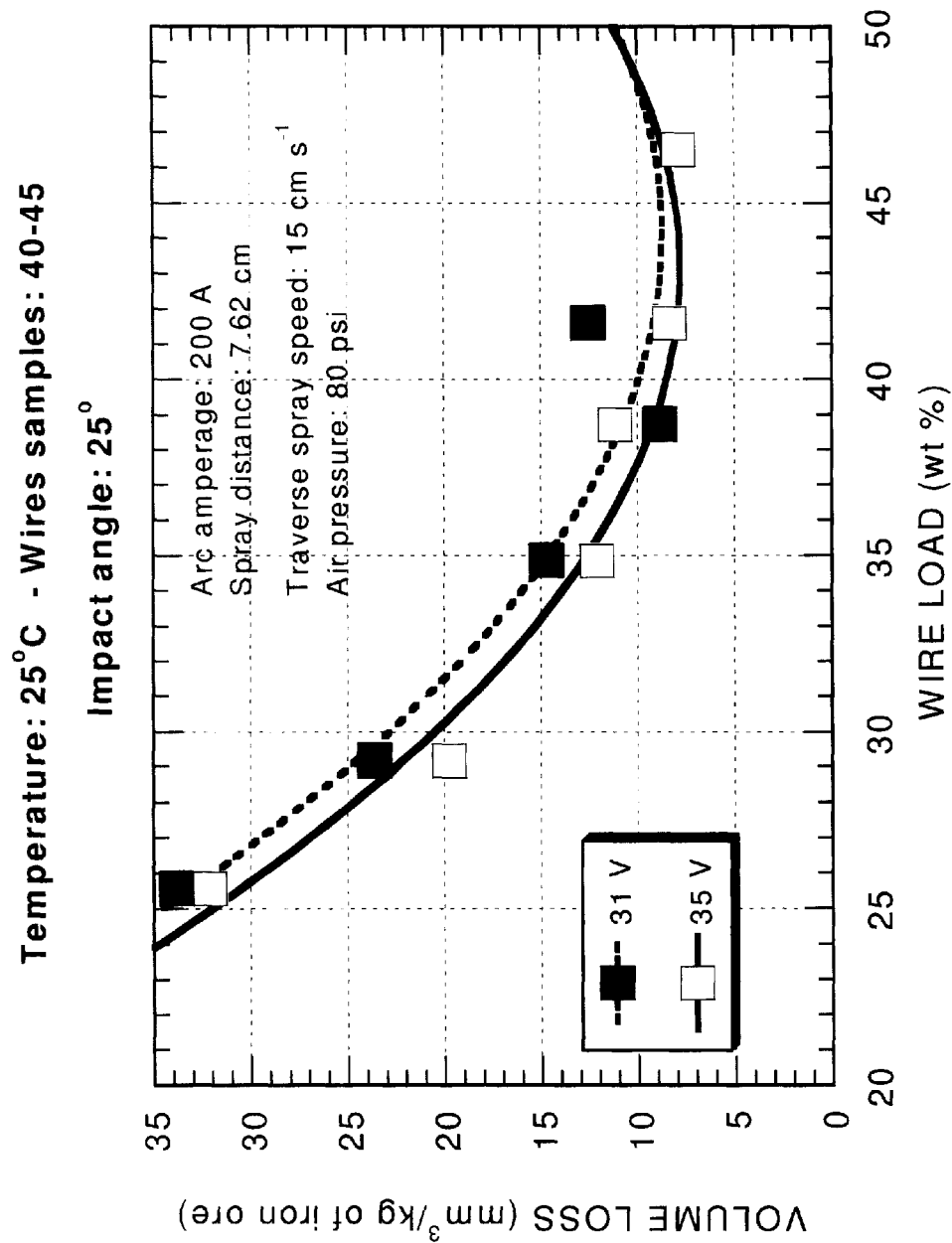
FIGS. 17, 18, 19, 20: Graphical representation of the effect of changes in the wire load on erosive volume loss at 25° C./25° impact angle (FIG. 17), 330° C./25° impact angle (FIG. 18), 25° C./90° impact angle (FIG. 19) and 330° C./90° impact angle (FIG. 20).
Figure 18:
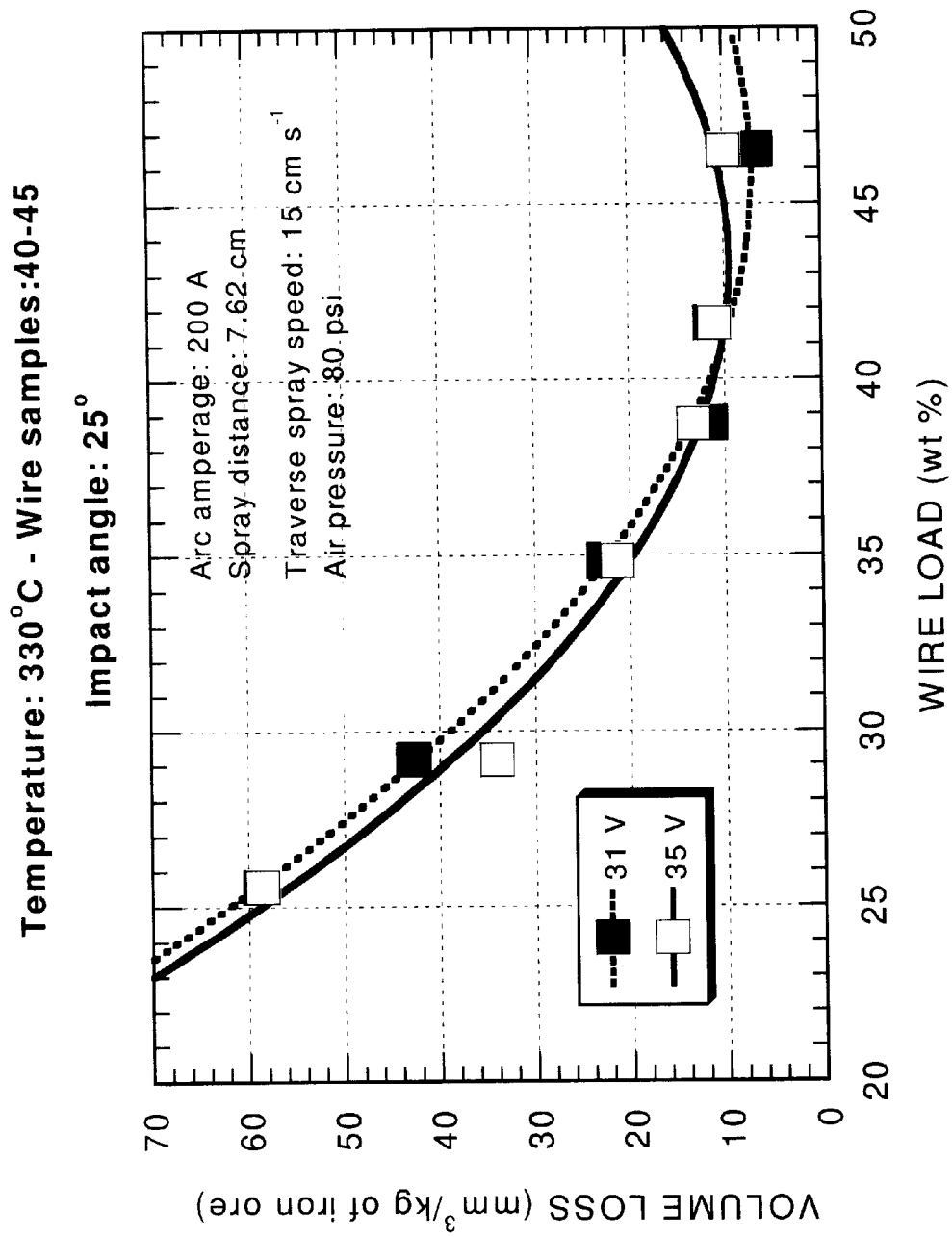
Figure 19:
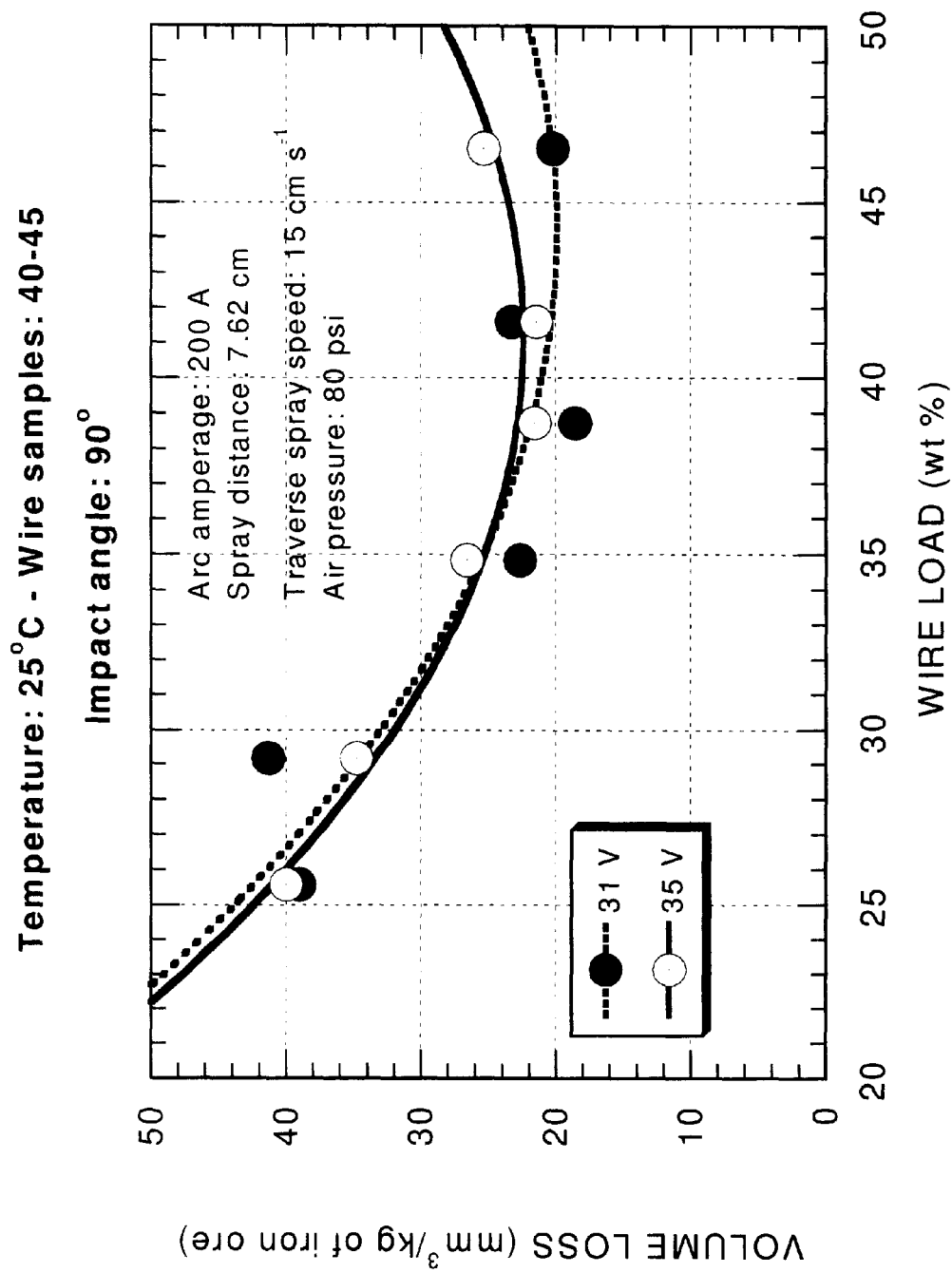
Figure 20:
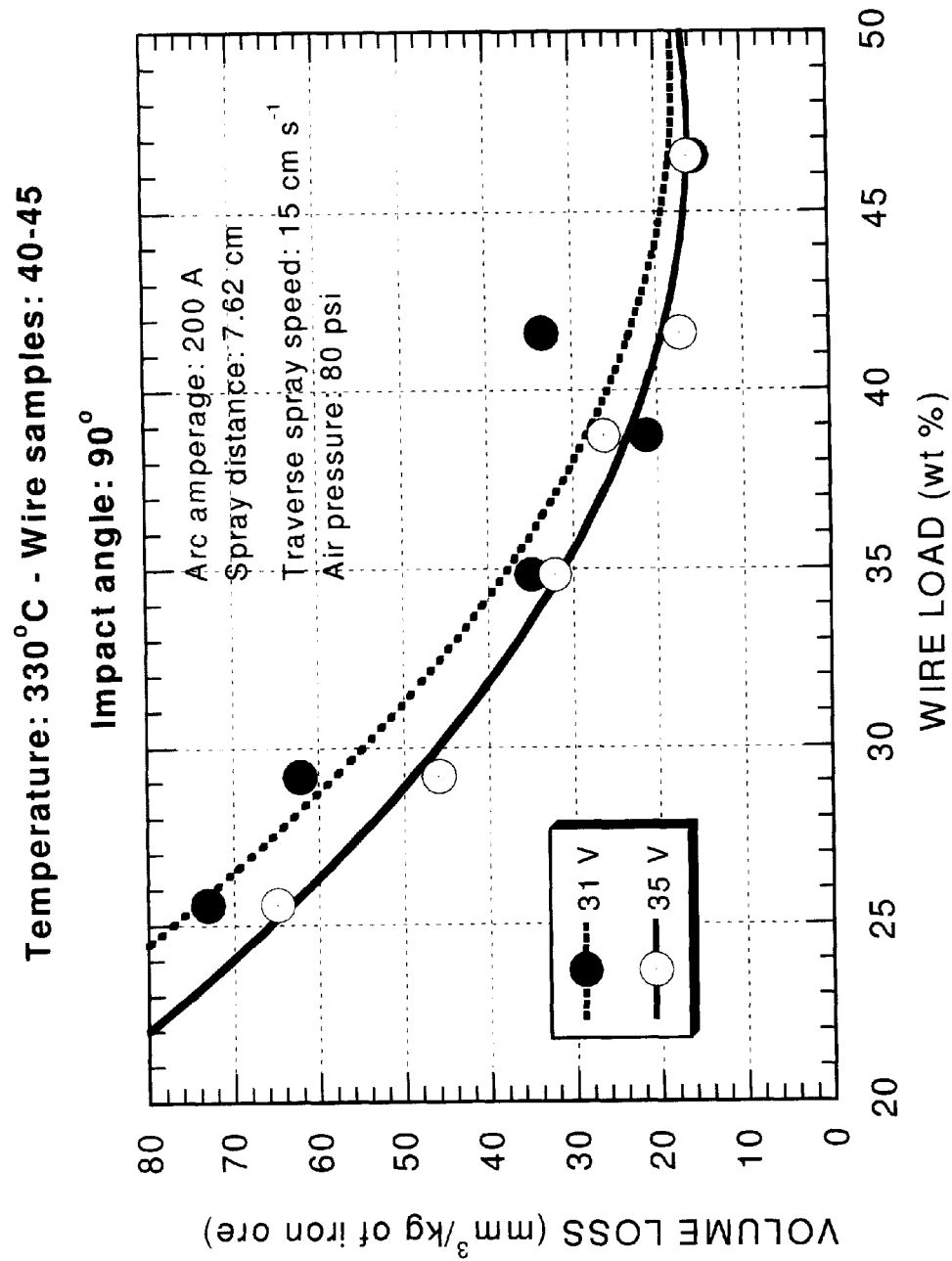

Typically, the invention would be used on site to apply an erosion resistant coating to a surface exposed to erodent particles, such as process fans or heat exchange tubes in fluidized bed combustors. The apparatus depicted schematically in FIG. 1 was designed to simulate an accelerated erosion environment in which to compare the erosion resistance of various coatings. This apparatus allows the evaluation of erosive wear on samples at temperatures up to 500° C. An alumina nozzle (1) having a diameter of 1.575 mm provides a well localized stream of particles. Particle flow-rates were selected to avoid particle-to-particle collisions which would result in under evaluation of the extent of erosion. A particle feeder (2) delivers particles to a mixing chamber (3) at a constant rate. The particles are then accelerated toward a coated target (4) by compressed air delivered to the mixing chamber by a coil (5). The target is held in position by an adjustable sample holder (6) which allows for erosion tests at different impact angles. A furnace (7) is provided for testing at elevated temperatures.

To measure erosion at elevated temperatures, the sample holder was introduced into the furnace 5 minutes prior to the introduction of erodent particles for impact angle tests at 90° and 10 minutes prior to impact angle tests at 25°. The compressed air passes through the furnace-heated coil (5) thereby elevating the temperature thereof.

Erodent particles were comprised of oven dried iron ore particles which varied in size from about 32 to about 300 μm.

The measurement of particle speed was done with a laser anemometer and the testing rig calibrated in order to obtain particle impact velocity of 100 m/s. Table 1A gives the main parameters used during erosion tests.

TABLE 1A

| Erosion test parameters | |
| --- | --- |
| Erodent material | Iron ore (−300 + 32 μm) |
| Erodent flow rate | 2.64 (+/−5%)g/minute |
| Erodent impact speed | 96.49(+/−22)m/s |
| Testing Time | 5 minutes |
| Test temperature (° C.) | 25 and 330° C. |

Wear damage was evaluated with a laser profilometer. This apparatus allows measurements with an accuracy greater than 99%. The profilometer is designed to measure minute volume losses and microscopic deformation. Volume losses are reported in $mm^3$ per kilogram of erodent particles.

The coatings were deposited on metallic target material by arc spraying a cored wire. The cored wire is comprised of a powdered core enclosed within a drawn metal sheath.

Core powders, comprised of iron, ferroboron or boron or metallic additives were mixed in a tumbler for 24 hours to evenly distribute particles of different sizes through the powder. The composition of each powder and the proportion of particles of different sizes are recited in Table 1B. The composition of metals which were used to prepare sheaths are shown in Table 1C.

TABLE 1B

Chemical Composition and Particle Size Distribution of Powders

| Powder | Composition | | Particle Size Distribution | | |
|---|---|---|---|---|---|
| | Element | Wt. % | U.S. Mesh Size | Sieve Size ($\mu$m) | Wt. % |
| Atomet 95D iron powder | Iron | 99.56 | +200 | +75 | 1.5 |
| | Oxygen | 0.39 | −200 + 325 | 45 | 2.5 |
| | Carbon | 0.05 | −325 | −45 | 96.0 |
| Atomet 95 iron powder | Iron | 99.79 | +200 | +75 | 2.5 |
| | Carbon | 0.21 | −200 + 325 | 45 | 7.0 |
| | | | −325 | −45 | 90.5 |
| Atomet 1001HP iron powder | Iron | >99 | | −250 + 150 | 10 |
| | Nickel | 0.07 | | −150 + 106 | 17 |
| | Oxygen | 0.06 | | −106 + 75 | 20 |
| | Chromium | 0.05 | | −75 + 45 | 25 |
| | Copper | 0.02 | | −45 | 28 |
| | Manganese | 0.015 | | | |
| | Phosphorous | 0.01 | | | |
| | Vanadium | 0.006 | | | |
| | Aluminum | 0.004 | | | |
| | Sulfur | 0.004 | | | |
| | Carbon | 0.004 | | | |
| | Silicon | 0.003 | | | |
| | Titanium | 0.001 | | | |
| Boron powder (Cerac Inc.) | Boron | 95–97 | | −5 | 100 |
| | Silicon | 0.03 | | | |
| | Magnesium | 0.2 | | | |
| | Iron | 0.1 | | | |
| | Calcium | 0.1 | | | |
| | Oxygen | Balance | | | |
| Ferroboron 1 (Shieldalloy Corp.) | Iron | 80.149 | +100 | | 37 |
| | Boron | 17.90 | +200 | | 36 |
| | Aluminum | 1.92 | +325 | | 14 |
| | Carbon | 0.03 | −325 | | 13 |
| | Sulfur | 0.001 | | | |
| Ferroboron 2 (Metallurg Ltd.) | Iron | 80.472 | +100 | | 34.0 |
| | Boron | 19.00 | +200 | | 33 |
| | Carbon | 0.31 | +325 | | 17.0 |
| | Silicon | 0.20 | −325 | | 16.0 |
| | Sulfur | 0.002 | | | |
| | Phosphorous | 0.016 | | | |
| Ferroboron 3 (Metallurg Ltd.) | Iron | 80.58 | +100 | | 43.0 |
| | Boron | 18.80 | +200 | | 35.0 |
| | Carbon | 0.149 | +325 | | 11.0 |
| | Silicon | 0.46 | −325 | | 11.0 |
| | Sulfur | 0.002 | | | |
| | Phosphorous | 0.009 | | | |
| Ferroboron 4 (Metallurg Ltd.) | Iron | 81.14 | +100 | | 28.0 |
| | Boron | 18.60 | +200 | | 38.0 |
| | Carbon | 0.03 | +325 | | 18.0 |
| | Silicon | 0.21 | −325 | | 16.0 |
| | Sulfur | 0.003 | | | |
| | Phosphorous | 0.02 | | | |

TABLE 1C

Composition of metals used to prepare the sheath of cored wires.

| Metal | Composition | |
|---|---|---|
| | Element | Wt. % |
| 1074 Steel | Carbon | 0.740 |
| | Manganese | 0.670 |
| | Chromium | 0.220 |
| | Silicon | 0.210 |
| | Nickel | 0.020 |
| | Phosphorous | 0.010 |
| | Sulfur | 0.002 |
| | Iron | Bal. |
| 1008 Steel | Manganese | 0.210 |
| | Carbon | 0.040 |
| | Aluminum | 0.034 |
| | Sulfur | 0.012 |
| | Silicon | 0.010 |
| | Phosphorous | 0.009 |
| | Iron | Bal. |
| 1005 Steel | Manganese | 0.2 |
| | Carbon | 0.03 |
| | Sulfur | 0.05 |
| | Phosphorous | 0.04 |
| | Iron | Bal. |

TABLE 1C-continued

Composition of metals used to prepare the sheath of cored wires.

| Metal | Element | Composition Wt. % |
|---|---|---|
| 304 Stainless Steel | Chromium | 18.54 |
| | Nickel | 9.52 |
| | Manganese | 1.41 |
| | Silicon | 0.53 |
| | Copper | 0.36 |
| | Molybdenum | 0.26 |
| | Carbon | 0.06 |
| | Nitrogen | 0.04 |
| | Phosphorous | 0.03 |
| | Sulfur | 0.001 |
| | Iron | Bal. |
| 430 Stainless Steel | Element | 16–18 |
| | Chromium | 1.0 |
| | Manganese | 1.0 |
| | Silicon | 0.12 |
| | Carbon | 0.04 |
| | Phosphorous | 0.03 |
| | Sulfur | Bal. |
| | Iron | |
| A-1 Kanthal Alloy | Element | 22 |
| | Chromium | 5.8 |
| | Aluminum | Bal. |
| | Iron | |

In a preferred embodiment of the invention, the metal sheath of the cored wire is derived from a metal strip which is about 0.254 or 0.127 mm thick and about 10.16 mm wide. The metal strip is drawn through a series of standard wire drawing dies aligned in descending order of diameter on the orifice. At the stage where the metal strip forms a "U" shape, a powdered mixture is introduced into the "U" shaped metal channel. The metal strip is then drawn through additional standard dies which seal the edges of the strip with an overlapping joint. The cored wire is then drawn to a final diameter of about 1.60 mm to achieve favourable compacting of the enclosed powder.

Arc spraying experiments were carried out with the above-described wires using a commercial Miller BP 400* Arc Spray System under ambient atmosphere. Coatings can be obtained by spraying with different gases as the atomizing gases. Air was preferred because of its availability and low cost.

For all experiments, the spraying conditions are indicated in Tables 3, 4 and 9–15. Voltage mentioned was almost stable during the arc spraying operation. For comparison purposes, arc sprayed coatings were also fabricated by spraying commercial wires. Their erosion resistance was evaluated by the same *Trade-mark method that was used with cored wires prepared according to the invention.

EXAMPLE 1 to 46, P-1 to P-6

The powder mixtures required for forming the core of the wires were blended in a tumbler for 24 hours. The resulting powder mixtures were each loaded in a metal strip to form after cold drawing a 1/16 inch (1.6 mm) diameter cored wire. One wire sample was cold drawn to 2.3 mm. The cored wires containing a loading percentage of the powder mixture were arc sprayed to form thick coatings. The coatings were erosion-tested using the blast type device depicted in FIG. 1 using iron ore as erodent. The volume loss was measured with the laser profilometer. The composition of cored wires for the different examples are shown in Table 2, the spraying parameters in Tables 3 and 4; the results of erosion tests expressed in $mm^3$ per kilogram of iron ore striking the material are shown in Tables 5 and 6.

TABLE 2

Composition and characteristics of cored wire samples

| Wire sample | Sheath material/ thickness (thousand of an inch) | Core wt %/iron type | Core wt %/ ferroboron type | Core wt % boron | Core wt % other elements | Wire loading (wt %) |
|---|---|---|---|---|---|---|
| 1 | 1074/0.005 | 70.92/ Atomet 1001HP | 24.66/ferroboron 1 (−15 μm) | 4.42 | — | 51.2 |
| 2 | 1074/0.005 | 91.2/Atomet 1001HP | — | 8.8 | — | 50.9 |
| 3 | 1074/0.005 | — | 60/ferroboron 1 (−100 + 38 μm) 40/ferroboron 1 (−15 μm) | — | — | 49.3 |
| 4 | 1074/0.005 | 88/Atomet 1001HP | | 12 | — | 44.4 |
| 5 | 1074/0.005 | 20/Atomet 95 | 48/ferroboron 1 (−100 + 38 μm) 32/ferroboron 1 (−15 μm) | — | — | 51.9 |
| 6 | 1074/0.005 | 40/Atomet 95 | 60/ferroboron 1 (−15 μm) | — | — | 42.9 |
| 7 | 1074/0.005 | 94/Atomet 1001HP | — | 6 | — | 53.6 |
| 8 | 1074/0.005 | 48/Atomet 95 | 48/ferroboron 1 (−75 + 38 μm) | 2 | — | 47.7 |
| 9 | 1074/0.005 | 40/Atomet 95 | 36/ferroboron 1 (−100 + 38 μm) 24/ferrbboron 1 (−15 μm) | — | — | 51.5 |
| 10 | 1074/0.005 | 15/Atomet | 85/ferroboron 1 (−15 μm) | — | — | 50.6 |

TABLE 2-continued

Composition and characteristics of cored wire samples

| Wire sample | Sheath material/ thickness (thousand of an inch) | Core wt %/iron type | Core wt %/ ferroboron type | Core wt % boron | Core wt % other elements | Wire loading (wt %) |
|---|---|---|---|---|---|---|
| 11 | 1074/0.005 | 60/Atomet 95 | 40/ferroboron 1 (−15 μm) | — | — | 52.4 |
| 12 | 1074/0.005 | 20/Atomet 95 | 80/ferroboron 1 (−38 μm) | — | — | 44.52 |
| 13 | 1074/0.005 | 45.6/Atomet 95 | 50/ferroboron 1 (−38 μm) | 4.4 | — | 37.4 |
| 14 | SS 304/0.005 | 44.14/ Atomet 95 | 55.86/ferroboron 1 (−15 μm) | — | — | 39.7 |
| 15 | SS 304/0.005 | 91.2/Atomet 1001HP | — | 8.8 | — | 53.8 |
| 16 | 1074/0.005 | 91.2/Atomet 1001HP | — | 8.8 | — | 41.3 |
| 17 | 1074/0.005 | 66/Atomet 95 | — | 9 | 25 Cr | 39.2 |
| 18 | 1008/0.01 | — | 100/ferroboron 1 (−38 μm) | — | — | 31.6 |
| 19 | 1074/0.01 | — | 100/ferroboron 1 (−38 μm) | — | — | 44.2 |
| 20 | 1008/0.01 | — | 99.6/ferroboron 1 (−38 μm) | — | 0.4 C | 31 |
| 21 | 1008/0.01 | 20/Atomet 95D | 80/ferroboron 2 (−75 μm) | — | — | 33.3 |
| 22 | 1008/0.01 | 35/Atomet 95D | 65/ferroboron 2 (−150 μm) | — | — | 39.2 |
| 23 | 1008/0.01 | — | 100/ferroboron 2 (−150 μm) | — | — | 40.6 |
| 24 | 1074/0.01 | 35/Atomet 95D | 65/ferroboron 2 (−75 μm) | — | — | 29.3 |
| 25 | 1074/0.01 | 20/Atomet 95D | 80/ferroboron 2 (−150 μm) | — | — | 34.4 |
| 26 | 1074/0.01 | — | 100/ferroboron 2 (−150 μm) | — | — | 37.13 |
| 27 | 1008/0.01 | — | 100/ferroboron 2 (−150 + 32 μm) | — | — | 41.3 |
| 28 | 1008/0.01 | 20/Atomet 95D | 80/ferroboron 2 (−150 + 32 μm) | — | — | 35.9 |
| 29 | 1008/0.01 | — | 160/ferroboron 2 | — | — | 42.4 |
| 30 | 1008/0.01 | — | 100/ferroboron 2 (+32 μm) | — | — | 42.6 |
| 31 | 1008/0.01 | — | 100/ferroboron 3 (−150 + 32 μm) | — | — | 42.3 |
| 32 | 1008/0.01 | — | 98/ferroboron 2 | 2 | — | 37.3 |
| 33 | S.S. 430/0.01 | — | 100/ferroboron 3 | — | — | 41.8 |
| 34 | 1008/0.01 | — | 96/ferroboron 3 | — | 4 Sn | 37.8 |
| 35 | 1008/0.01 | — | 100/ferroboron 4 | — | — | 33.9 |
| 36 | 1008/0.01 | — | 100/ferroboron 4 | — | — | 43.8 |
| 37 | S.S. 304/0.01 | — | 100/ferroboron 4 | — | — | 40.8 |
| 39 | Kanthal A-1/0.01 | — | 100/ferroboron 3 | — | — | 38.3 |
| 40 | 1008/0.01 | — | 100/ferroboron 2 | — | — | 46.5 |
| 41 | 1008/0.01 | — | 100/ferroboron 2 | — | — | 41.6 |
| 42 | 1008/0.01 | — | 100/ferroboron 2 | — | — | 38.7 |
| 43 | 1008/0.01 | — | 100/ferroboron 2 | — | — | 34.8 |
| 44 | 1008/0.01 | — | 100/ferroboron 2 | — | — | 29.2 |
| 45 | 1008/0.01 | — | 100/ferroboron 2 | — | — | 25.6 |
| P-1 | 1005/0.01 | — | 100/ferroboron 2 (−150 + 32 μm) | — | — | 35.27 |
| P-2-A | 1005/0.01 | — | 100/ferroboron 3 (−150 + 32μm) | — | — | 38.75 |
| P-2-B | 1005/0.01 | — | 100/ferroboron 3 (−150 + 32 μm) | — | — | 38.3 |
| P-2-C | 1005/0.01 | — | 100/ferroboron 3 (−150 + 32 μm) | — | — | 37.63 |
| P-3 | 1005/0.01 | — | 100/ferroboron 3 | — | — | 39.5 |
| P-5 | 1005/0.01 | — | 100/ferroboron 3 | — | — | 37.4 |
| P-6 | 1005/0.01 | — | 100/ferroboron 4 | — | — | 34.9 |
| 46 | 1008/0.01 | — | 100/ferroboron 2 | — | — | 48.2 wire diameter 2.3 mm |

TABLE 3

Spraying parameters of cored wires.

| Cored wire number | Arc voltage (V) | Arc current (A) | Spray distance (cm) | Transverse spray speed (cm/s) |
|---|---|---|---|---|
| 1 | 27.5 | 100 | 10.2 | 30 |
| 2 | 27.5 | 105 | 10.2 | 30 |
| 3 | 29 | 100 | 10.2 | 30 |
| 4 | 27.5 | 100 | 10.2 | 15 |
| 5 | 29 | 100 | 10.2 | 15 |
| 6 | 29 | 100 | 10.2 | 15 |
| 7 | 29 | 100 | 10.2 | 15 |
| 8 | 29 | 100 | 10.2 | 15 |
| 9 | 29 | 100 | 10.2 | 15 |
| 10 | 30.5 | 100 | 10.2 | 15 |
| 11 | 29 | 100 | 10.2 | 15 |
| 12 | 29 | 100 | 10.2 | 15 |
| 2-12 | 29 | 100 | 10.2 | 15 |
| 13 | 29 | 100 | 10.2 | 15 |
| 14 | 30 | 100 | 10.2 | 15 |
| 15 | 33 | 100 | 10.2 | 15 |
| 16 | 30 | 100 | 10.2 | 15 |
| 17 | 30 | 100 | 10.2 | 15 |
| 18 | 30 | 100 | 10.2 | 15 |
| 19 | 30 | 100 | 10.2 | 15 |
| 20 | 30 | 100 | 10.2 | 15 |
| 21 | 30 | 100 | 10.2 | 15 |
| 22 | 30 | 100 | 10.2 | 15 |
| 23 | 30 | 100 | 10.2 | 15 |
| 24 | 30 | 100 | 10.2 | 15 |
| 25 | 30 | 100 | 10.2 | 15 |
| 26 | 30 | 100 | 10.2 | 15 |
| 27 | 30 | 100 | 10.2 | 15 |
| 28 | 30 | 100 | 10.2 | 15 |
| 29 | 30 | 100 | 10.2 | 15 |
| 30 | 30 | 100 | 10.2 | 15 |
| 31 | 30 | 100 | 10.2 | 15 |
| 31 | 31 | 150 | 7.62 | 15 |
| 32 | 30 | 100 | 10.2 | 15 |
| 33-1 | 30 | 100 | 7.62 | 15 |
| 33-2 | 35 | 200 | 7.62 | 15 |
| 33-3 | 31 | 200 | 7.62 | 15 |
| 34 | 30 | 100 | 7.62 | 15 |
| 35 | 31 | 200 | 7.62 | 15 |
| 36 | 31 | 200 | 7.62 | 15 |
| 37-1 | 31 | 200 | 7.62 | 15 |
| 37-2 | 35 | 200 | 7.62 | 15 |
| 39-1 | 31 | 200 | 7.62 | 15 |
| 39-2 | 30 | 100 | 7.62 | 15 |
| 46 | 35 | ~225 | 7.62 | 15 |
| Pilot 2-A,B,C | 31 | 200 | 7.62 | 15 |
| P-3 | 31 | 200 | 7.62 | 15 |
| P-6 | 31 | 200 | 7.62 | 15 |

Figure 21:
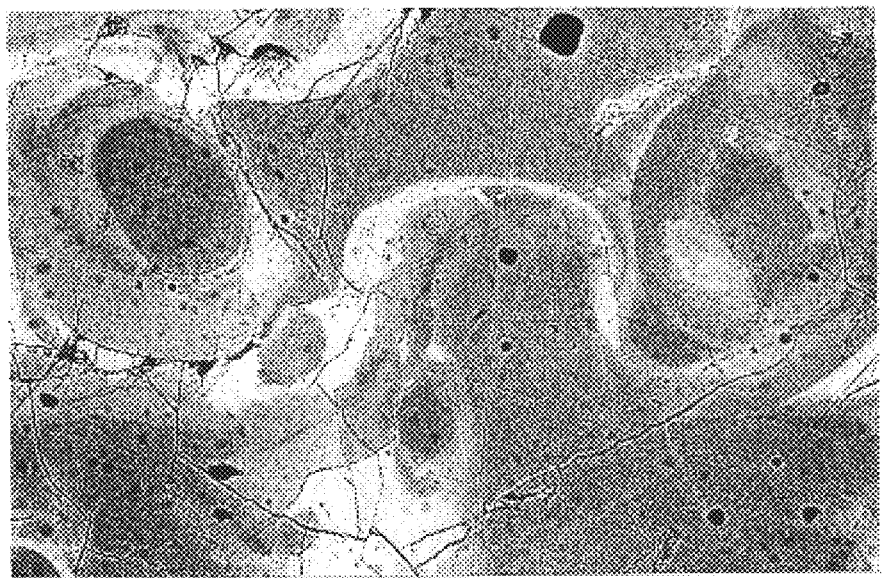
FIG. 21: Scanning electron micrographs of the surface of arc sprayed coatings using cored wire P-3 (400 fold magnification).
Figure 21:
Figure 22:
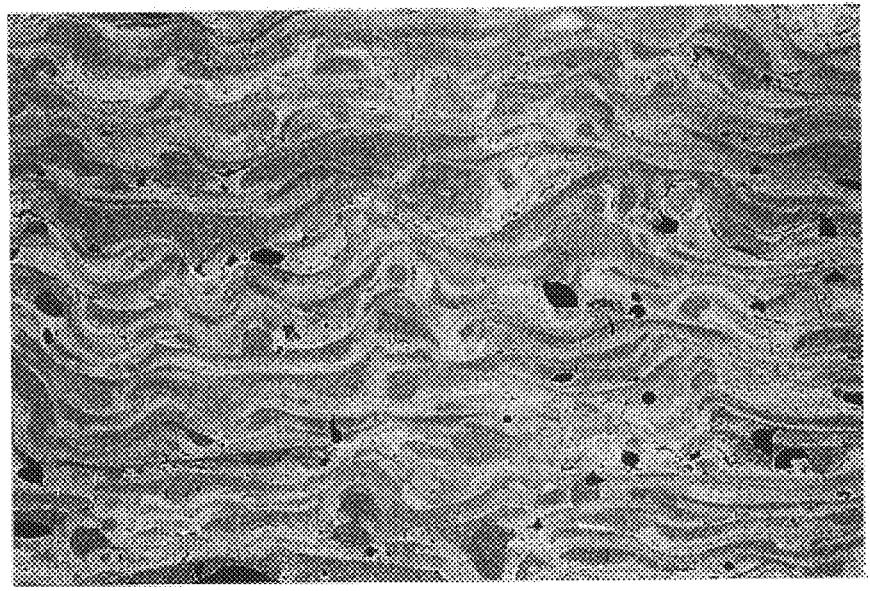
FIG. 22: Scanning electron micrograph of a cross-section of an arc-sprayed coating using cored wire P-3 (300 fold magnification).
Figure 22:

To investigate the effect of arc current, spray distance and transverse spray speed on the resultant coatings, one cored wire embodiment of the invention (P1) was deposited under different spraying conditions (Table 4). The erosion rates for these coatings are shown in Table 5. The results demonstrate that an increase in arc current and hence an increase in the deposition rate produces a coating with improved erosion resistance. A reduce spray distance also improves the coating. In preferred embodiments, the spraying distance will be maintained at about 7.5–10.5 cm. The transverse spray speed does not significantly affect the properties of the coatings. Additional results of erosion volume loss under varied spraying conditions are reported in Tables 9–15. The results, represented graphically in FIGS. 2–12 confirm that coatings done with high arc voltage and amperage, low spray distance and low transverse spray speed resulted in low volume loss at both impact angles of 25° and 90° and temperatures of 25° C. and 330° C. The effect of wire load is shown in Tables 14 and 15 and is represented graphically in FIGS. 13–20. The eroded volume loss of sprayed coatings decreased as the wire load increased for all the erosion conditions tested. FIG. 21 comprises two scanning electron micrographs of a surface that has been coated with embodiment P-3 of the invention. Scanning electron micrographs of cross-sections of a coated surface are shown in FIG. 22. These figures show that coatings presented ferroboride phases (shown in dark contrast) larger than the mean particle impact damage size of 14.5 mm.

TABLE 4

Spraying parameters for pilot cored wire (P-1).

| Coating designation | Arc voltage (V) | Arc current (A) | Spray distance (cm) | Transverse spray speed (cm/s) |
|---|---|---|---|---|
| P1-01 | 30 | 100 | 10.2 | 15 |
| P1-02 | 30 | 100 | 20.3 | 60 |
| P1-03 | 32 | 100 | 10.2 | 60 |
| P1-04 | 32 | 100 | 20.3 | 15 |
| P1-05 | 31 | 150 | 7.62 | 15 |
| P1-06 | 31 | 150 | 15.24 | 30 |
| P1-07 | 31 | 200 | 7.62 | 30 |
| P1-08 | 31 | 200 | 15.24 | 15 |
| P1-09 | 31 | 200 | 7.62 | 15 |

TABLE 5

Erosion volume loss of arc sprayed coatings done with Pilot wire 1 of this invention at 25° C. and 330° C. for impact angles (α) of 25° and 90°.

| Coating designation | Temp. = 25° C. α = 90° (mm³/kg) | Temp. = 25° C. α = 25° (mm³/kg) | Temp. = 330° C. α = 90° (mm³/kg) | Temp. = 330° C. α = 25° (mm³/kg) |
|---|---|---|---|---|
| P1-01 | 46.7 | 18.6 | 29.8 | 15.6 |
| P1-02 | 96.1 | 37.4 | 42.0 | 23.3 |
| P1-03 | 57.2 | 18.2 | 29.3 | 18.3 |
| P1-04 | 64.8 | 33.9 | 39.9 | 21.9 |
| P1-05 | 24.7 | 10.3 | 18.5 | 11.7 |
| P1-06 | 52.2 | 13.2 | 26.4 | 18.3 |
| P1-07 | 23.5 | 8.2 | 17.0 | 7.7 |
| P1-08 | 31.0 | 10.9 | 24.9 | 11.5 |
| P1-09 | 25.0 | 8.3 | 14.7 | 9.6 |

Erosion test results for common metals and alloys are shown in Table 7 and the results of coatings prepared from commercial wires and from a cored wire according to the subject invention (P-3) are shown in Table 8. The results shown in Tables 7 and 8 demonstrate that cored wires according to the present invention provide coatings which are vastly superior in erosion resistance than those provided by commercial wires or by common metals and alloys.

TABLE 6

Erosion volume loss of arc sprayed coatings done with sample wires of this invention at 25° C. and 330° C. for impact angles (α) of 25° and 90°.

| Cored wire sample | Temp. = 25° C. α = 90° (mm³/kg) | Temp. = 25° C. α = 25° (mm³/kg) | Temp. = 25° C. α = 90° (mm³/kg) | Temp. = 25° C. α = 25° (mm³/kg) |
|---|---|---|---|---|
| 1 | 80.3 | 40.3 | 119.7 | 71.6 |
| 2 | 53.3 | 32.7 | 89.8 | 69.8 |
| 3 | 136.5 | 46.7 | 39.0 | 32.2 |
| 4 | 66.4 | 32.3 | 78.0 | 54.8 |
| 5 | 104.8 | 56.4 | 48.0 | 26.2 |
| 6 | 63.0 | 39.4 | 78.9 | 65.0 |
| 7 | 52.0 | 42.0 | 83.3 | 79.5 |
| 8 | 135.5 | 68.0 | 96.4 | 58.4 |
| 9 | 136.1 | 72.8 | 99.2 | 58.1 |
| 10 | 83.7 | 46.3 | 58.2 | 40.0 |
| 11 | 61.7 | 46.7 | 82.8 | 74.5 |

TABLE 6-continued

Erosion volume loss of arc sprayed coatings done with sample wires of this invention at 25° C. and 330° C. for impact angles (α) of 25° and 90°.

| Cored wire sample | Temp. = 25° C. α = 90° (mm³/kg) | Temp. = 25° C. α = 25° (mm³/kg) | Temp. = 25° C. α = 90° (mm³/kg) | Temp. = 25° C. α = 25° (mm³/kg) |
|---|---|---|---|---|
| 12 | 102.7 | 50.7 | 79.0 | 43.3 |
| 2-12 | 91.6 | 35.0 | 78.5 | 51.4 |
| 13 | 129.8 | 53.7 | 89.2 | 60.0 |
| 14 | 75.9 | 51.8 | 103.7 | 86.6 |
| 15 | 56.2 | 38.1 | 86.6 | 73.6 |
| 16 | 49.5 | 39.5 | 87.9 | 77.3 |
| 17 | 39.8 | 36.6 | 78.9 | 81.0 |
| 18 | 89.9 | 20.7 | 84.2 | 47.6 |
| 19 | 124.8 | 42.9 | 63.8 | 29.2 |
| 20 | 141.4 | 49.2 | 65.6 | 29.6 |
| 21 | 66.4 | 38.4 | 75.8 | 52.3 |
| 22 | 76.5 | 35.2 | 87.1 | 63.5 |
| 23 | 38.0 | 16.3 | 18.9 | 16.2 |
| 24 | 91.3 | 31.1 | 58.3 | 43.8 |
| 25 | 77.0 | 34.1 | 50.5 | 28.0 |
| 26 | 58.9 | 20.9 | 24.8 | 14.8 |
| 27 | 30.6 | 8.8 | 12.3 | 4.9 |
| 28 | 72.7 | 21.8 | 39.8 | 22.3 |
| 29 | 29.2 | 12.5 | 11.4 | 3.9 |
| 30 | 39.2 | 13.2 | 12.5 | 2.4 |
| 31 | 65.3 | 24.2 | 20.5 | 14.1 |
| 31 | 28.6 | 6.0 | 9.7 | 5.1 |
| 32 | 68.4 | 13.0 | 23.7 | 8.6 |
| 33-1 | 88.41 | 40.91 | 37.73 | 17.73 |
| 33-2 | 30.45 | 6.14 | 18.33 | 11.29 |
| 33-3 | 23.56 | 8.33 | 18.86 | 9.70 |
| 34 | 42.05 | 28.18 | 41.97 | 26.52 |
| 35 | 25.98 | 14.24 | 32.88 | 20.15 |
| 36 | 23.11 | 12.20 | 20.00 | 8.94 |
| 37-1 | 18.94 | 11.29 | 22.35 | 8.79 |
| 37-2 | 26.29 | 10.98 | 18.79 | 11.44 |
| 39-1 | 324.55 | 114.92 | 106.52 | 39.77 |
| 39-2 | 371.06 | 171.82 | 131.06 | 69.32 |
| 46 | 24.62 | 9.62 | 6.14 | 2.80 |
| P-2-A | 18.86 | 5.30 | 16.52 | 7.27 |
| P-2-B | 23.18 | 6.59 | 15.90 | 7.58 |
| P-2-C | 21.52 | 5.08 | 15.61 | 7.12 |
| P-3 | 9.3 | 7.04 | 15.8 | 13.6 |
| P-6 | 19.02 | 11.02 | 17.12 | 13.86 |
| GMAW | 14.4 | 6.6 | 13.4 | 6.1 |

TABLE 7

Erosion volume loss of common metals and alloys at 25° C. and 330° C. for impact angles (α) of 25° and 90°.

| Material | Temp. = 25° C. α = 90° (mm³/kg) | Temp. = 25° C. α = 25° (mm³/kg) | Temp. = 330° C. α = 90° (mm³/kg) | Temp. = 330° C. α = 25° (mm³/kg) |
|---|---|---|---|---|
| AISI 1045 steel | 25.4 | 56.7 | 51.1 | 79.7 |
| Stainless steel 316 | 30.7 | 59.0 | 53.0 | 95.6 |
| Nickel 200 | 33.9 | 53.0 | 39.5 | 85.0 |
| Copper | 34.6 | 66.3 | 59.1 | 140.1 |
| Inconel 625 | 33.4 | 61.7 | 63.0 | 98.3 |

TABLE 8

Erosion volume loss of arc sprayed coatings done with commercial wires and P-3 wire at 25° C. and 330° C. for impact angles (α) of 25° and 90°.

| Wire designation | Temp. = 25° C. α = 90° (mm³/kg) | Temp. = 25° C. α = 25° (mm³/kg) | Temp. = 330° C. α = 90° (mm³/kg) | Temp. = 330° C. α = 25° (mm³/kg) |
|---|---|---|---|---|
| P-3 | 9.3 | 7.04 | 15.8 | 13.6 |
| SS | 53.94 | 64.32 | 67.85 | 113.94 |
| 95 MXC | 49.09 | 41.21 | 71.55 | 72.35 |
| Colmonoy 88 | 54.47 | 47.65 | 122.2 | 97.12 |
| Armacor M | 46.97 | 40.98 | 73.41 | 72.95 |
| Armacor 16 | 52.27 | 59.85 | 91.44 | 118.03 |
| Duocor | 130.68 | 71.67 | 164.17 | 96.97 |
| 97 T | 55.38 | 58.11 | 101.59 | 105.45 |
| 440 C | 46.14 | 55.23 | 84.17 | 102.50 |
| Tufton 500 | 53.26 | 65.08 | 91.59 | 106.29 |

Colmonoy 88 is the Wall Colmonoy Corporation trade-mark of a nickel alloy cored wire. Armacor 16, Armacor M and Duocor are the Amorphous Technologies International trade-marks of iron-based cored wires. 95MXC Ultrahard is the Hobart Tafa Technologies trade-mark of a proprietary high chrome steel alloy cored wire. 97T is the Metallisation Limited trade-mark of a steel-based cored wire containing tungsten carbide. Tufton 500 is the Mogul-Miller Thermal Inc. trade-mark of steel wire. 440C is a martensitic stainless steel. SS-1 is a stainless steel wire of Mogul-Miller Thermal Inc.

Tables 9–15 provide erosion volume losses for embodiments of the invention where particular spraying parameters are varied namely, transverse spray speed (Table 9), arc voltage (Table 10), arc amperage (Tables 11, 12), spraying distance (Table 13) and wire load (Tables 14 and 15).

TABLE 9

Influence of transverse spray speed on erosion volume loss of arc-sprayed coatings manufactured with P-3 cored wire

| Transverse spray speed (cm/s) | Temp. = 25° C. α = 90° (mm³/kg) | Temp. = 25° C. α = 25° (mm³/kg) | Temp. = 330° C. α = 90° (mm³/kg) | Temp. = 330° C. α = 25° (mm³/kg) |
|---|---|---|---|---|
| 2 | 6.6 | 5.4 | 15.0 | 10.5 |
| 5 | 15.4 | 8.3 | 20.5 | 9.6 |
| 10 | 14.8 | 7.1 | 18.1 | 9.8 |
| 15 | 17.8 | 8.6 | 19.9 | 11.0 |

TABLE 10

Influence of arc voltage on erosion volume loss of arc-sprayed coatings manufactured with P-5 cored wire. Arc amperage: 200 A, spray traverse speed: 15 cm/s, spray distance: 7.52 cm, air atomizing pressure: 80 psi.

| Arc Voltage (V) | Temp. = 25° C. $\alpha = 90°$ (mm$^3$/kg) | Temp. = 25° C. $\alpha = 25°$ (mm$^3$/kg) | Temp. = 330° C. $\alpha = 90°$ (mm$^3$/kg) | Temp. = 330° C. $\alpha = 25°$ (mm$^3$/kg) |
|---|---|---|---|---|
| 29 | 26.67 | 11.74 | 30.91 | 15.46 |
| 31 | 18.71 | 9.47 | 18.49 | 10.83 |
| 33 | 20.23 | 8.79 | 18.94 | 17.73 |
| 35 | 14.09 | 7.27 | 18.86 | 10.68 |
| 37 | 19.32 | 7.95 | 22.27 | 11.97 |

TABLE 11

Influence of arc amperage on erosion volume loss of arc-sprayed coatings manufactured with P-5 cored wire. Arc voltage: 31V, spray transverse speed: 15 cm/s, spray distance: 7.52 cm, air atomizing pressure: 80 psi.

| Arc amperage (A) | Temp. = 25° C. $\alpha = 90°$ (mm$^3$/kg) | Temp. = 25° C. $\alpha = 25°$ (mm$^3$/kg) | Temp. = 330° C. $\alpha = 90°$ (mm$^3$/kg) | Temp. = 330° C. $\alpha = 25°$ (mm$^3$/kg) |
|---|---|---|---|---|
| 100 | 53.40 | 13.6 | 36.7 | 20.6 |
| 150 | 20.91 | 8.9 | 19.9 | 15.3 |
| 200 | 25.15 | 9.7 | 24.4 | 15.9 |
| 250 | 13.64 | 6.7 | 19.8 | 12.5 |
| 300 | 13.49 | 7.8 | 22.9 | 15.3 |

TABLE 12

Influence of arc amperage on erosion volume loss of arc-sprayed coatings manufactured with P-5 cored wire. Arc voltage: 35V, spray transverse. speed: 15 cm/s, spray distance: 7.52 cm, air atomizing pressure: 80 psi.

| Arc amperage (A) | Temp. = 25° C. $\alpha = 90°$ (mm$^3$/kg) | Temp. = 25° C. $\alpha = 25°$ (mm$^3$/kg) | Temp. = 330° C. $\alpha = 90°$ (mm$^3$/kg) | Temp. = 330° C. $\alpha = 25°$ (mm$^3$/kg) |
|---|---|---|---|---|
| 100 | 31.59 | 17.50 | 33.41 | 21.14 |
| 150 | 27.88 | 12.58 | 30.76 | 19.17 |
| 200 | 14.09 | 7.05 | 23.64 | 13.49 |
| 250 | 9.62 | 6.21 | 24.55 | 10.30 |
| 300 | 7.20 | 5.38 | 21.29 | 15.53 |

TABLE 13

Influence of spray distance on erosion volume loss of arc-sprayed coatings manufactured with P-5 cored wire. Arc voltage: 31V, arc amperage 200 A, spray transverse speed: 15 cm/s, air atomizing pressure: 80 psi.

| Spray distance (cm) | Temp. = 25° C. $\alpha = 90°$ (mm$^3$/kg) | Temp. = 25° C. $\alpha = 25°$ (mm$^3$/kg) | Temp. = 330° C. $\alpha = 90°$ (mm$^3$/kg) | Temp. = 330° C. $\alpha = 25°$ (mm$^3$/kg) |
|---|---|---|---|---|
| 7.62 | 20.83 | 10.30 | 23.20 | 12.80 |
| 10.16 | 24.55 | 11.20 | 22.40 | 16.50 |
| 12.70 | 23.03 | 12.50 | 26.60 | 14.10 |
| 15.24 | 30.23 | 12.20 | 17.80 | 15.10 |
| 17.78 | 30.38 | 14.40 | 21.00 | 17.70 |
| 20.32 | 31.44 | 14.70 | 25.70 | 20.90 |

TABLE 14

Influence of wire load on erosion volume loss of arc-sprayed coatings manufactured with 40 to 45 cored wires. Arc voltage: 31V, arc amperage 200 A, spray transverse speed: 15 cm/s, air atomizing pressure: 80 psi.

| Cored Wire No | Core Load (wt %) | Temp. = 25° C. $\alpha = 90°$ (mm³/kg) | Temp. = 25° C. $\alpha = 25°$ (mm³/kg) | Temp. = 330° C. $\alpha = 90°$ (mm³/kg) | Temp. = 330° C. $\alpha = 25°$ (mm³/kg) |
|---|---|---|---|---|---|
| 45 | 25.6 | 39.01 | 33.86 | 73.11 | 58.86 |
| 44 | 29.2 | 41.36 | 23.64 | 62.20 | 42.88 |
| 43 | 34.8 | 22.65 | 14.77 | 35.00 | 22.80 |
| 42 | 38.7 | 18.56 | 8.86 | 21.29 | 11.52 |
| 41 | 41.6 | 23.26 | 12.58 | 33.48 | 11.52 |
| 40 | 46.5 | 20.23 | 7.95 | 15.68 | 6.67 |

TABLE 15

Influence of wire load on erosion volume loss of arc-sprayed coatings manufactured with 40 to 45 cored wires. Arc voltage: 35V, arc amperage 200 A, spray transverse speed: 15 cm/s, air atomizing pressure: 80 psi.

| Cored Wire No | Core Load (wt %) | Temp. = 25° C. $\alpha = 90°$ (mm³/kg) | Temp. = 25° C. $\alpha = 25°$ (mm³/kg) | Temp. = 330° C. $\alpha = 90°$ (mm³/kg) | Temp. = 330° C. $\alpha = 25°$ (mm³/kg) |
|---|---|---|---|---|---|
| 45 | 25.6 | 39.01 | 33.86 | 73.11 | 58.86 |
| 44 | 29.2 | 41.36 | 23.64 | 62.20 | 42.88 |
| 43 | 34.8 | 22.65 | 14.77 | 35.00 | 22.80 |
| 42 | 38.7 | 18.56 | 8.86 | 21.29 | 11.52 |
| 41 | 41.6 | 23.26 | 12.58 | 33.48 | 11.52 |
| 40 | 46.5 | 20.23 | 7.95 | 15.68 | 6.67 |

Example with Gas Metal Arc Welding (GMAW)

P-3 cored wire was deposited by using the Gas Metal Arc Welding (GMAW) process with a Hobart Mega-Flex* 650 RVS apparatus. Argon with 2% oxygen flowing at 25 cubic feet per minute was used for depositing P-3 cored wire feed at a rate of 250 inches per minute. Arc voltage of 30 V and amperage of 200 A were used in this example. The erosion volume loss is shown in Table 16.

*Trade-mark

TABLE 16

Erosion volume loss for coating prepared using cored wire P-3 using Gas Metal Arc Welding (GMAW)

| Cored wire sample | Temp. = 25° C. $\alpha = 90°$ (mm³/kg) | Temp. = 25° C. $\alpha = 25°$ (mm³/kg) | Temp. = 330° C. $\alpha = 90°$ (mm³/kg) | Temp. = 330° C. $\alpha = 25°$ (mm³/kg) |
|---|---|---|---|---|
| P-3 | 14.4 | 6.6 | 13.4 | 6.1 |

With reference to compositions of the wires recited in Table 2, the spraying parameters in Tables 3 and 4, the erosion results reported in Tables 4, 5, and 6 and results reported in Tables 7–15, the following conclusions were determined:

a) Arc sprayed coatings containing only steel and boron powders (samples 2, 4, 7, 15 and 16) did not present erosion resistance better than 1045 steel at 25° C. and 330° C. for both particle impact angle of 25° and 90°. The maximum percentage of boron that could be reached was 12 wt. % in example 4. The global composition of this coating (5.33 wt. % boron) corresponds to a composition higher than that of the eutectic melt in the fe-B system. This composition is higher in boron than that described by Moen. Addition of chromium within the core (sample 17) did not improve the erosion resistance at 330° C. All these coatings contain fine crystals dispersed in metals. The nature, size and distribution of these microstructural features do not provide enhanced resistance to particle impact events.

b) Arc sprayed coatings done with wires having in their core steel and ferroboron presented improved erosion properties (for at least one erosion condition) in comparison with those containing only steel and boron powders. Higher is the erosion resistance lower is their steel content within the core, higher should be their ferroboron content and larger should be the particle size of ferroboron. (Samples: 5, 6, 9, 10–12, 14, 21–22, 24, 25, 28).

c) Arc sprayed coatings done with cored wires having in their cores steel, ferroboron and boron (Samples 1, 8, 13) did not present improved properties over conventional steel. As in a) boron forms low melting point materials having microstructural features not compatible with the particle impact events.

d) Arc sprayed coatings done with cored wires containing within their cores only ferroboron (Samples 3, 18, 19, 23, 26, 27, 29–31, 33, 35–37, 40–46, P-1, P-2, P-3, P-5, P-6) present improved erosion properties over conventional steel at the temperature of 330° C. and also at room temperature.

As shown, the erosion resistance of coatings is related to the size of ferroboron particles within the core. Large particles of ferroboron favour the development of microstructural features that can efficiently deflect the erodent particles. Table 8 provides a comparison of the erosion resistance of example P-3 with that of arc sprayed coatings done with commercial wires.

e) Arc sprayed coatings done with cored wires having wire sheaths made of metals having high affinity for oxygen such as A-1 kanthal alloy, a ferrous alloy containing aluminum (Example 39), are merely not erosion-resistant.

The test results confirm that powders comprised of larger ferroboron particles provide better erosion resistance than powders comprised of smaller particles. Preferred embodiments of the invention will include ferroboron powders in which the majority of particles are greater than about 45 µm in size. One preferred core powder includes a mixture of ferroboron particles wherein 30–40 wt. % are particles having sizes larger than 150 µm, 30–40 wt. % are particles having sizes between 150 and 75 µm, 10–15 wt. % are particles having sizes between 75 and 45 µm and about 15 wt. % are particles having sizes less than 45 µm.

The results also demonstrate that a ductile, low carbon steel, such as 1005 steel, is the preferred material for use in preparation of the metal sheath. In preferred embodiments, the ferroboron powder core will comprise between 20 and 48 wt. % and the ductile metal sheath will comprise between 80 and 52 wt. % of the cored wire.

We claim:

1. An erosion resistant coating adhered to a substrate to be exposed to erodent particles ringing in size from 32–300 µm and having a known impact area comprising hard ferroboride phases interspersed within a ductile metal phase comprising a metal having a low affinity for oxygen selected from the group consisting of Cu, Bi, As, Sb, Co, Ni, Cd and Fe, wherein the majority of said hard ferroboride phases each have a surface area greater in size than said known impact area of said erodent particles and said ductile metal phase has surface areas of exposure between said hard phases, and wherein said ductile metal phase has surface areas being generally smaller in size than said known impact areas of said erodent particles.

2. The coating of claim 1 wherein said known impact area is 14.5 µm.

3. The coating of claim 1 wherein the surface areas of the majority of said hard ferroboron phases are greater in size than about 14.5 µm.

4. The coating of claim 1 wherein the majority of the exposed surface areas of the ductile metal phase are smaller in size than about 14.5 µm.

* * * * *